United States Patent
Braun et al.

(10) Patent No.: US 7,580,915 B2
(45) Date of Patent: *Aug. 25, 2009

(54) SOCKET-LIKE COMMUNICATION API FOR C

(75) Inventors: Bernhard Braun, Ramemberg (DE); Oliver Luik, Baden-Wurttemberg (DE)

(73) Assignee: SAP AG, Walldorf (DE)

( * ) Notice: Subject to any disclaimer, the term of this patent is extended or adjusted under 35 U.S.C. 154(b) by 304 days.

This patent is subject to a terminal disclaimer.

(21) Appl. No.: 11/013,278

(22) Filed: Dec. 14, 2004

(65) Prior Publication Data

US 2006/0129512 A1 Jun. 15, 2006

(51) Int. Cl.
  *G06F 17/30* (2006.01)
(52) U.S. Cl. .............................. 707/1; 707/9; 707/100; 707/102; 718/100
(58) Field of Classification Search ........................ None
  See application file for complete search history.

(56) References Cited

U.S. PATENT DOCUMENTS

| | | | |
|---|---|---|---|
| 5,331,318 A | 7/1994 | Montgomery | |
| 5,566,302 A | 10/1996 | Khalidi et al. | |
| 5,566,315 A | 10/1996 | Milillo et al. | |
| 5,617,570 A | 4/1997 | Russell et al. | |
| 5,682,328 A | 10/1997 | Roeber et al. | |
| 5,692,193 A | 11/1997 | Jagannathan et al. | |
| 5,710,909 A | 1/1998 | Brown et al. | |
| 5,745,778 A | 4/1998 | Alfieri | |
| 5,805,790 A | 9/1998 | Nota et al. | |
| 5,905,868 A | 5/1999 | Baghai et al. | |
| 5,909,540 A | 6/1999 | Carter et al. | |
| 5,926,834 A | 7/1999 | Carlson et al. | |
| 5,944,781 A | 8/1999 | Murray | |
| 5,951,643 A | 9/1999 | Shelton et al. | |
| 5,999,179 A | 12/1999 | Kekic et al. | |
| 6,038,571 A | 3/2000 | Numajiri et al. | |
| 6,065,006 A | 5/2000 | deCarmo et al. | |
| 6,092,171 A | 7/2000 | Relph | |
| 6,115,712 A | 9/2000 | Islam et al. | |

(Continued)

FOREIGN PATENT DOCUMENTS

EP  0 459 931 A2  12/1991

(Continued)

OTHER PUBLICATIONS

White Paper: 'Using Rules-based Object Caching', spiritsoft/spiritcache 4.0 2004, (2004).

(Continued)

*Primary Examiner*—Truong Cam Y
*Assistant Examiner*—Shyue Jiunn Hwa
(74) *Attorney, Agent, or Firm*—Blakely Sokoloff Taylor & Zafman

(57) ABSTRACT

A system and method are described for performing data processing using shared memory and socket-like application programming interface. In one embodiment, a plurality of handles is employed and associated with a plurality of processes. The plurality of handles may serve as communication end-points for communication of data. Further, an application programming interface is employed to present the plurality of handles as the application programming interface for sockets for facilitating the communication of data compatible with a programming language.

3 Claims, 18 Drawing Sheets

U.S. PATENT DOCUMENTS

| | | |
|---|---|---|
| 6,115,721 A | 9/2000 | Nagy |
| 6,167,423 A | 12/2000 | Chopra et al. |
| 6,199,179 B1 | 3/2001 | Kauffman et al. |
| 6,216,212 B1 | 4/2001 | Challenger et al. |
| 6,256,712 B1 | 7/2001 | Challenger |
| 6,272,598 B1 | 8/2001 | Arlitt et al. |
| 6,282,566 B1 | 8/2001 | Lee, Jr. et al. |
| 6,295,582 B1 | 9/2001 | Spencer |
| 6,330,709 B1 | 12/2001 | Maynard et al. |
| 6,336,170 B1 | 1/2002 | Dean et al. |
| 6,345,386 B1 | 2/2002 | Delo et al. |
| 6,349,344 B1 | 2/2002 | Sauntry et al. |
| 6,356,529 B1 | 3/2002 | Zarom |
| 6,356,946 B1 | 3/2002 | Clegg et al. |
| 6,412,045 B1 | 6/2002 | DeKoning et al. |
| 6,415,364 B1* | 7/2002 | Bauman et al. ............. 711/155 |
| 6,424,828 B1 | 7/2002 | Collins et al. |
| 6,425,057 B1 | 7/2002 | Cherkasova et al. |
| 6,438,654 B1 | 8/2002 | Elko et al. |
| 6,467,052 B1 | 10/2002 | Kaler et al. |
| 6,519,594 B1 | 2/2003 | Li |
| 6,553,377 B1 | 4/2003 | Eschelbeck et al. |
| 6,587,937 B1 | 7/2003 | Jensen et al. |
| 6,591,347 B2 | 7/2003 | Tischler et al. |
| 6,601,112 B1 | 7/2003 | O'Rourke et al. |
| 6,615,253 B1* | 9/2003 | Bowman-Amuah ......... 709/219 |
| 6,640,244 B1* | 10/2003 | Bowman-Amuah ......... 709/207 |
| 6,643,802 B1 | 11/2003 | Frost et al. |
| 6,651,080 B1 | 11/2003 | Liang et al. |
| 6,654,948 B1 | 11/2003 | Konuru et al. |
| 6,658,478 B1 | 12/2003 | Singhal et al. |
| 6,681,251 B1 | 1/2004 | Leymann et al. |
| 6,687,702 B2 | 2/2004 | Vaitheeswaran et al. |
| 6,738,977 B1 | 5/2004 | Berry et al. |
| 6,760,911 B1* | 7/2004 | Ye ............................. 719/314 |
| 6,766,419 B1 | 7/2004 | Zahir et al. |
| 6,769,022 B1 | 7/2004 | DeKoning et al. |
| 6,772,409 B1 | 8/2004 | Chawla et al. |
| 6,795,856 B1 | 9/2004 | Bunch |
| 6,799,202 B1 | 9/2004 | Hankinson et al. |
| 6,854,114 B1 | 2/2005 | Sexton et al. |
| 6,879,995 B1 | 4/2005 | Chinta et al. |
| 6,970,925 B1 | 11/2005 | Springmeyer et al. |
| 7,003,770 B1 | 2/2006 | Pang et al. |
| 7,024,512 B1 | 4/2006 | Franaszek et al. |
| 7,024,695 B1 | 4/2006 | Kumar et al. |
| 7,058,957 B1 | 6/2006 | Nguyen |
| 7,089,566 B1* | 8/2006 | Johnson ...................... 719/328 |
| 7,124,170 B1 | 10/2006 | Sibert |
| 7,127,713 B2 | 10/2006 | Davis et al. |
| 7,130,891 B2 | 10/2006 | Bernardin et al. |
| 7,149,741 B2* | 12/2006 | Burkey et al. ............... 707/100 |
| 7,155,512 B2 | 12/2006 | Lean et al. |
| 7,165,239 B2 | 1/2007 | Hejlsberg et al. |
| 7,191,170 B2 | 3/2007 | Ganguly et al. |
| 7,194,761 B1 | 3/2007 | Champagne |
| 7,203,769 B2 | 4/2007 | Schnier |
| 7,216,160 B2 | 5/2007 | Chintalapati et al. |
| 7,237,140 B2 | 6/2007 | Nakamura et al. |
| 7,246,167 B2 | 7/2007 | Kalmuk et al. |
| 7,254,634 B1 | 8/2007 | Davis et al. |
| 7,296,267 B2 | 11/2007 | Cota-Robles et al. |
| 7,302,423 B2 | 11/2007 | De Bellis |
| 7,373,647 B2 | 5/2008 | Kalmuk et al. |
| 7,386,848 B2 | 6/2008 | Cavage et al. |
| 7,395,338 B2 | 7/2008 | Fujinaga |
| 2001/0029520 A1* | 10/2001 | Miyazaki et al. ............ 709/200 |
| 2002/0046325 A1 | 4/2002 | Cai et al. |
| 2002/0049767 A1 | 4/2002 | Bennett |
| 2002/0052914 A1 | 5/2002 | Zalewski et al. |
| 2002/0073283 A1 | 6/2002 | Lewis et al. |
| 2002/0078060 A1* | 6/2002 | Garst et al. ................. 707/100 |
| 2002/0093487 A1 | 7/2002 | Rosenberg |
| 2002/0129264 A1 | 9/2002 | Rowland et al. |
| 2002/0133805 A1 | 9/2002 | Pugh et al. |
| 2002/0147888 A1 | 10/2002 | Trevathan |
| 2002/0169926 A1 | 11/2002 | Pinckney et al. |
| 2002/0174097 A1 | 11/2002 | Rusch et al. |
| 2002/0181307 A1 | 12/2002 | Fifield et al. |
| 2002/0198953 A1 | 12/2002 | O'Rourke et al. |
| 2003/0009533 A1 | 1/2003 | Shuster |
| 2003/0014521 A1 | 1/2003 | Elson et al. |
| 2003/0014552 A1 | 1/2003 | Vaitheeswaran et al. |
| 2003/0023827 A1 | 1/2003 | Palanca et al. |
| 2003/0028671 A1 | 2/2003 | Mehta et al. |
| 2003/0037178 A1* | 2/2003 | Vessey et al. ............... 709/319 |
| 2003/0058880 A1 | 3/2003 | Sarkinen et al. |
| 2003/0084248 A1 | 5/2003 | Gaither et al. |
| 2003/0084251 A1 | 5/2003 | Gaither et al. |
| 2003/0088604 A1 | 5/2003 | Kuck et al. |
| 2003/0093487 A1 | 5/2003 | Czajkowski et al. |
| 2003/0097360 A1 | 5/2003 | McGuire et al. |
| 2003/0105887 A1* | 6/2003 | Cox et al. ................... 709/328 |
| 2003/0115190 A1* | 6/2003 | Soderstrom et al. ............ 707/3 |
| 2003/0120811 A1 | 6/2003 | Hanson et al. |
| 2003/0131010 A1 | 7/2003 | Redpath |
| 2003/0131286 A1 | 7/2003 | Kaler et al. |
| 2003/0177356 A1 | 9/2003 | Abela |
| 2003/0177382 A1 | 9/2003 | Ofek et al. |
| 2003/0187927 A1 | 10/2003 | Winchell |
| 2003/0191795 A1 | 10/2003 | Bernardin et al. |
| 2003/0195923 A1 | 10/2003 | Bloch et al. |
| 2003/0196136 A1* | 10/2003 | Haynes et al. ................ 714/13 |
| 2003/0200526 A1 | 10/2003 | Arcand |
| 2003/0212654 A1* | 11/2003 | Harper et al. .................. 707/1 |
| 2003/0229760 A1 | 12/2003 | Doyle et al. |
| 2004/0003033 A1 | 1/2004 | Kamen et al. |
| 2004/0024610 A1* | 2/2004 | Fradkov et al. ................. 705/1 |
| 2004/0024881 A1 | 2/2004 | Elving et al. |
| 2004/0024971 A1 | 2/2004 | Bogin et al. |
| 2004/0045014 A1* | 3/2004 | Radhakrishnan ............ 719/328 |
| 2004/0117441 A1 | 6/2004 | Liu et al. |
| 2004/0167980 A1 | 8/2004 | Doyle et al. |
| 2004/0168029 A1 | 8/2004 | Civlin |
| 2004/0181537 A1* | 9/2004 | Chawla et al. .............. 707/100 |
| 2004/0187140 A1* | 9/2004 | Aigner et al. ............... 719/328 |
| 2004/0205144 A1 | 10/2004 | Otake |
| 2004/0205299 A1 | 10/2004 | Bearden |
| 2004/0213172 A1 | 10/2004 | Myers et al. |
| 2004/0215703 A1 | 10/2004 | Song et al. |
| 2004/0215883 A1 | 10/2004 | Bamford et al. |
| 2004/0221285 A1 | 11/2004 | Donovan et al. |
| 2004/0221294 A1 | 11/2004 | Kalmuk et al. |
| 2005/0021594 A1 | 1/2005 | Bernardin et al. |
| 2005/0021917 A1 | 1/2005 | Mathur et al. |
| 2005/0027943 A1 | 2/2005 | Steere et al. |
| 2005/0044197 A1 | 2/2005 | Lai |
| 2005/0044301 A1 | 2/2005 | Vasilevsky et al. |
| 2005/0060704 A1 | 3/2005 | Bulson et al. |
| 2005/0071459 A1 | 3/2005 | Costa-Requena et al. |
| 2005/0086656 A1 | 4/2005 | Whitlock et al. |
| 2005/0086662 A1 | 4/2005 | Monnie et al. |
| 2005/0125503 A1 | 6/2005 | Iyengar et al. |
| 2005/0138193 A1 | 6/2005 | Encarnacion et al. |
| 2005/0160396 A1* | 7/2005 | Chadzynski ................ 717/103 |
| 2005/0180429 A1 | 8/2005 | Ghahremani et al. |
| 2005/0188068 A1 | 8/2005 | Kilian |
| 2005/0198199 A1 | 9/2005 | Dowling |
| 2005/0216502 A1 | 9/2005 | Kaura et al. |
| 2005/0256880 A1 | 11/2005 | Nam Koong et al. |
| 2005/0262181 A1* | 11/2005 | Schmidt et al. ............. 709/200 |
| 2005/0262493 A1 | 11/2005 | Schmidt et al. |
| 2005/0262512 A1 | 11/2005 | Schmidt et al. |
| 2005/0268238 A1 | 12/2005 | Quang et al. |

| | | | |
|---|---|---|---|
| 2005/0278274 | A1 | 12/2005 | Kovachka-Dimitrova et al. |
| 2005/0278346 | A1* | 12/2005 | Shang et al. ............... 707/100 |
| 2006/0053112 | A1* | 3/2006 | Chitkara et al. ............... 707/9 |
| 2006/0053425 | A1 | 3/2006 | Berkman et al. |
| 2006/0059453 | A1 | 3/2006 | Kuck et al. |
| 2006/0064545 | A1 | 3/2006 | Wintergerst |
| 2006/0064549 | A1 | 3/2006 | Wintergerst |
| 2006/0070051 | A1 | 3/2006 | Kuck et al. |
| 2006/0092165 | A1 | 5/2006 | Abdalla et al. |
| 2006/0094351 | A1 | 5/2006 | Nowak et al. |
| 2006/0129512 | A1 | 6/2006 | Braun et al. |
| 2006/0129546 | A1 | 6/2006 | Braun et al. |
| 2006/0129981 | A1 | 6/2006 | Dostert et al. |
| 2006/0143328 | A1 | 6/2006 | Fleischer et al. |
| 2006/0143359 | A1 | 6/2006 | Dostert et al. |
| 2006/0143389 | A1 | 6/2006 | Kilian et al. |
| 2006/0143392 | A1 | 6/2006 | Petev et al. |
| 2006/0143609 | A1 | 6/2006 | Stanev |
| 2006/0143618 | A1 | 6/2006 | Fleischer et al. |
| 2006/0143619 | A1 | 6/2006 | Galchev et al. |
| 2006/0150197 | A1 | 7/2006 | Werner |
| 2006/0155867 | A1 | 7/2006 | Kilian et al. |
| 2006/0159197 | A1 | 7/2006 | Kraut et al. |
| 2006/0167980 | A1 | 7/2006 | Werner |
| 2006/0168646 | A1 | 7/2006 | Werner |
| 2006/0168846 | A1 | 8/2006 | Juan |
| 2006/0206856 | A1* | 9/2006 | Breeden et al. ............. 717/101 |
| 2006/0294253 | A1 | 12/2006 | Linderman |
| 2007/0150586 | A1 | 6/2007 | Kilian et al. |
| 2007/0156907 | A1 | 7/2007 | Galchev et al. |
| 2007/0266305 | A1 | 11/2007 | Cong et al. |

FOREIGN PATENT DOCUMENTS

| | | |
|---|---|---|
| EP | 1380941 | 1/2004 |
| EP | 1027796 | 6/2004 |
| GB | 2365553 | 2/2002 |
| WO | WO 00/23898 | 4/2000 |
| WO | WO03073204 | 9/2003 |
| WO | WO2004038586 | 5/2004 |

OTHER PUBLICATIONS

"JSR: 107: JCACHE", *JSR 107: JCACHE—Java Temporary Caching API, Website*, http://web1.jcp.org/en;jsr/detail?id=107, Nov. 28, 2004, 4.

"What is LDAP?", http://www.gracion.com/server/whatldap.html, (Dec. 7, 2004).

Barrett, Ryan, Barrett, Ryan, P4 Protocol Specification, Sep. 2001, p. 1-12.

Casavant, T. L., et al., ""A Taxonomy of Scheduling in General-Purpose Distributed Computing Systems"", Casavant, T.L., and Kuhl, J.G., *"A Taxonomy of Scheduling in General-Purpose Distributed Computing Systems" IEEE* 14(2):141-154, (1988) XP000039761., (1988), 141-154.

Dandamudi, S. P., "Reducing Run Queue Contention in Shared Memory Multipocessors", Dandamudi, S.P., *"Reducing Run Queue Contention in Shared Memory Multipocessors," IEEE* pp. 82-89 (1997) XP000657329., (1997), 82-89.

Handy, Jim, "The Cache Memory Book", *1998, Academic Press Inc, 2nd Edition*, pp. 60, (1998), vii-229.

Hennessy, John, et al., "Computer Organization and Design", *1998, Morgan Kaufmann Publishers Inc.*, 2nd Edition, pp. 575-576.

Jagannathan, et al., "High-Level Abstraction for Efficient Concurrent Systems", *NEC Research Institute*, Section 5.2, (Mar. 1994), 20.

Pasin, Marcia, et al., "High-Available Enterprise JavaBeans Using Group Communication System Support", Pasin, et al., *"High-Available Enterprise JavaBeans Using Group Communication System Support"*, pp. 1-6, XP002285985 1-6.

Polk, Jennifer, et al., "Oracle Database Net Services Administrator's Guide 10g Release 1 (10.1)", URL: http://download-west.oracle.com/docs/cd/B19306_01/network.102/b14212.pdf>; Oct. 2005; retrieved on Apr. 26, 2007., reference No. XP002431369, (Oct. 2005), 1-29.

Rosenberg, David, "Bringing Java to the Enterprise: Oracle on its Java Server Strategy", *IEEE Internet Computing IEEE USA*, vol. 2, No. 2; Database accession No. 5902816, XP002431362; ISSN: 1089-7801, Mar. 2, 1998 52-59.

Salo, Timo, et al., "Object Persistence Beyond Serialization", *Increasing Productivity and Reducing Maintenance, Dr. Dobb's Journal*, M7T Publ., vol. 24, No. 5, May 1999, pp. 5, XP000925486. ISSN: 1044-789X.

Salo, Timo, et al., "Persistence in Enterprise JavaBeans Applications", pp. 3, *JOOP*, Jul. 1999, XP-002142904.

Smits, Thomas, "Unbreakable Java—The Java Server that Never Goes Down", Thomas Smits, *"Unbreakable Java", The Java Server that Never Goes Down*, Nov. 2004, pp. 1-5., Source Date: Nov. 2004. FIP Program made me elect a day I chose day 1 because I couldn't get to the next screen to load art. Carla Vignola Jul. 10, 2007, (Nov. 2004), 5.

Srinivasan, V., et al., "Object Persistence in Object-Oriented Applications", *IBM Systems Journal, IBM Corp.*, vol. 36, No. 1, 1997, pp. 11, XP000685709, ISSN: 0018-8670.

Stark, Ian, "CS2 Advanced Programming in Java Note 9", 2002, pp. 1-5.

Tanenbaum, A. S., "Multimedia Operating Systems", Tanenbaum, A.S., *Modern Operating Systems*, 2nd Edition, Upper Saddle River, New Jersey: Prentice-Hall, Inc., pp. 531-578 (2001). English Translation of: Moderne Betriebssysteme, vol. 2, pp. 539-617, (2002) XP002385695., (2002), 539-617.

Tuttle, Steven, et al., "Understanding LDAP Design and Implementation", IBM.com Redbooks, (Jun. 2004), 1-774.

Werner, Randolf, "Connection of Clients For Management of Systems", U.S. Appl. No. 11/026,604, filed Dec. 30, 2004.

Werner, Randolf, "Interface For External System Management", U.S. Appl. No. 11/027,812, filed Dec. 29, 2004.

Werner, Randolf, "Security For External System Management", U.S. Appl. No. 11/026,323, filed Dec. 29, 2004.

Yue, K. K., et al., "An Effective Processor Allocation Strategy for Multiprogrammed Shared-Memory Multiprocessors", Yue, K.K. and Lilja, D.J., *"An Effective Processor Allocation Strategy for Multiprogrammed Shared-Memory Multiprocessors," IEEE* 8(12):1246-1258, (1997)., (1997), 1246-1258.

""Design Overview"", *2003 Sun Microsystems*, http://java.sun.com.j2se/1.5.0/docs/guied/jni/spec/design.html; retrieved on Jan 18, 2008.

"6570P189 OA Mailed Mar. 31, 2008 for U.S. Appl. No. 11/025,378", Whole Document.

"6570P207 FOA Mailed Aug. 17, 2007 for U.S. Appl. No. 11/013,277", Whole Document.

"6570P207 OA Mailed Jan. 7, 2008 for U.S. Appl. No. 11/013,277", Whole Document.

"6570P207 OA Mailed Mar. 12, 2007 for U.S. Appl. No. 11/013,277", Whole Document.

"6570P209 FOA Mailed Aug. 28, 2007 for U.S. Appl. No. 11/012,803", Whole Document.

"6570P209 OA Mailed Jan. 24, 2008 for U.S. Appl. No. 11/012,803", Whole Document.

"6570P209 OA Mailed Mar. 16, 2007 for U.S. Appl. No. 11/012,803", Whole Document.

"6570P216 OA Mailed Jan. 24, 2008 for U.S. Appl. No. 11/024,393", Whole Document.

"6570P217 OA Mailed Feb. 21, 2008 for U.S. Appl. No. 11/027,812", Whole Documents.

"6570P220 OA Mailed Jan. 10, 2008 for U.S. Appl. No. 11/027,387", Whole Document.

"6570P220 OA Mailed Apr. 19, 2007 for U.S. Appl. No. 11/027,387", Whole Document.

"All Classes", http://www.jdocs.com/osche/2.0.2/api/com/opensymphony/oscache/base/allclases-frame.html, (Jan. 2004), 1.

"All Classes, Packages", http://www.jdocs.com/osche/2.0.2/api/overview-frame.html, *OSCache 2.0.2*, (Jan. 2004), 1.

"Caching with IBM WebSphereMQ", *spiritcache, Use Case & Code Example, article*, (Nov. 19, 2004), 1-9.

"Class AbstractCacheAdministrator", http://www.jdocs.com/osche/2.0.2/api/com/opensymphony/oscache/base/AbstractCache.html, (Jan. 2004), 1-11.

"Class Cache", http://www.jdocs.com/osche/2.0.2/api/com/opensymphony/oscache/base/Cache.html, (Jan. 2004), 1-16.

"Class CacheEntry", http://www.jdocs.com/osche/2.0.2/api/com/opensymphony/oscache/base/CacheEntry.html, (Jan. 2004), 1-8.

"Class Config", http://www.jdocs.com/osche/2.0.2/api/com/opensymphony/oscache/base/Config.html, (Jan. 2004), 1-4.

"EP 05027361, European Search Report", (Mar. 28, 2006), Whole Document.

"Failover for Clustered RMI-P4 Remote Objects", *SAP Library*, http://help.sap.com/saphelp_nw04/helpdata/en/f6/4ef11ab3a52f408aa8a133f33d6cf1/cont, (Nov. 2004), 1-3.

"Failover for Enterprise Beans", *SAP Library*, http://help.sap.com/saphelp_nw04/helpdata/en/8f/d6e45953a494499ea1b79ab16321d2/cont. (Nov. 2004), 1-3.

"Failover System", *SAP Library*, http://help.sap.com/saphelp_nw04/helpdata/en/d7/57af0cce55143be5de3a6e4911186.cont, (Nov. 2004), 2.

"High Availability and Failover", *SAP Library*, http://help.sap.com/saphelp_nw04/helpdata/en/6c/209da105668c45be12f1d9cc412e2b/cont. (Nov. 2004), 1-2.

"Http Sessions and Failover of Web Application", *SAP Library*, http://help.sap.com/saphelp_nw04/helpdata/en/90/044cc585eaba42b649f16181b0fdf/cont., (Nov. 2004), 1.

"Introducing Cache-Forward Architecture", *ObjectStore, paper*,(Jan. 1, 2004), 1-23.

"Java Technology in SAP Web Application Server", *SAP Library*, http://help.sap.com/saphelp_nw04/helpdata/en/0d/a3bbeff62847ae10000000a114084/cont. (Nov. 2004), 1-3.

"Java VineetB-log.java", http://homepage.mac.com/vineetb/iblog/C684524823/, (Dec. 18, 2003), 1.

"JCS Plugin Overview", http://jakarta.apache.org/jcs/Plugins.html, (Jul. 2004), 2.

"Load Balancing of the SAP Web As for Java Applications", *SAP Library*, http://help.sap.com/saphelp_nw04/helpdata/en/b5/e8239ef7bd494f896a84625d4b688f/cont., (Nov. 2004), 2.

"Managers—Intro", http://db.apache.org/torque-32/managers-cache.html, (Apr. 11, 2002), 1-4.

"Open Source Cache Solutions in Java", http://java-source.net/open-source/cache-solutions, (Nov. 2004), 1-3.

"OSCache", http://www.opensymphony.com/oscache, (Nov. 2004), 1.

"OSCache 2.0.2", http://www.jdocs.com/osche/2.0.2/api/com/opensymphony/oscache/base/overview-frame.html, (Jan. 2004), 1.

"OSCache, V 2.0.2 API Specification", http://www.jdocs.com/osche/2.0.2/api/com/opensymphony/oscache/base/overview-sum.html, (Jan. 2004), 2.

"SAP Beefs Up Java Support Capabilities For New NetWeaver", *News Story*, (Computerworld). http:www.computerworld.com/print-this/2004/0,4814,96558,00.html, (Oct. 11, 2004), 1-2.

"SAP NetWever Makes Standard Java Robust", http://www.sap.com/company/press/press.epx?pageview=print&pressid=3069, (Oct. 5, 2004), 1-2.

"SAP Presents New Capabilities For Netweaver", *InfoWorld*, http://www.infoworld.com/article/04/10/06/HNsapnetweaver_1.html, (Oct. 6, 2004), 1-5.

"Shared disk I/O cache", IP.Com Journal, IP.Com Inc., West Henrietta, XP013014199 ISSN: 1533-0001, (Jan. 29, 2004), 6.

"spiritcache", http://www.spirit-soft.com/index.do?id=30, (Nov. 2004), 1.

"System and Method for Shared Memory/File System Java ObjectGroup Clustered JVM", http://www.priorartdatabase.com/IPCOM/000021597/, (Jan. 2004), 3.

"turbine-jcs-dev", http://www.mail-archive.com/turbine-jcs-dev@jakarta.apache.org/msg00647.html, (Jul. 13, 2004), 1-3.

"Using Rules-based Object Caching: Allocating dataresources for best service levels to profitable customers", *spiritcache, White paper*, (Nov. 2004), 1-8.

"WebLogic RMI Features and Guidelines", eDocs, http://e-docs.bea.com/wls/docs90/rmi/rmi_api.html, (Nov. 2004), 1-7.

Barker, et al., ""A load balancing framework for adaptive and asynchronous applications"", *Parallet and Distributed Systems, IEEE Transactions on* vol. 15, Issue 2, (Feb. 2004), pp. 183-192.

Bortvedt, Jerry , "Functional Specification for Object Caching Service for Java (OCS4J), 2.0", (Aug. 9, 2000), pp. 1-27.

Bresch, Stefan , "Object-relational mapping system and method for generic relationships", 6570P165 U.S. Appl. No. 10/864,185, filed Jun. 8, 2004—Final Office Action mailed Mar. 17, 2008.

Bryce, Ciaran , "Isolates: A New Approach to Multi-Programming in Java Platforms", *LogOn Technology Transfer, Kronerg, Germany, Experts' Corner*, (May 2004), 7.

Conter, Thomas , "Implementing OSCache", http://www.pas.net/tom/articles/oscache/en/, (Jun. 2002), 1-4.

Czajowski, Grzegorz , et al., "A Multi-User Virtual Machine", *Paper, Sun Microsystems Laboratories and S3 Lab*, Purdue University, West Lafayette, IN, (2003), 14.

Czajkowski, Grzegorz , "Multitasking without Compromise: A Virtual Machine Evolution", *Paper, Sun Microsystems Laboratories*, (2001), 1-14.

Dagfinn, Parnas , "SAP Virtual Machine Container", https://weblogs.sdn.sap.com/pub/wlg/940, (Oct. 23, 2004), 1-4.

Davies, Robert , "Data Caching: A Prerequisite to the Enterprise Service Bus", *Business Integration Journal*, (Oct. 2003), 41-44.

Dillenbeger, D. , et al., "Building a java Virtual Machine For Serve Applications: The Jvm On Os/390", *IBM Systems Journal*, vol. 39, No. 1, (2000), 194-210.

Doyle, Patrick , et al., "A Modular and Extensible JVM Infrastructure", *Paper*, Edward S. Rogers Sr. Department of Electrical and Computer Engineering, University of Toronto, Toronto, Ontario, Canada, (Jul. 2002), 14.

Dwarkadas, Sandhya , et al., "Cashmere-VLM: Remote Memory Paging for Software Distributed Shared Memory", *Paper*, Compaq Cambridge Research Lab, Cambridge, MA and Department of Computer Science, University of Rochester, Rochester, NY, (Apr. 1999), 7.

Ferguson, Renee B., "SAP Preps New NetWeaver Capabilities", eWeek.com, http://www.eweek.com/article2/0,1759,1668146,00.asp, (Oct. 7, 2004), 1-6.

Galchev, Galin , "Plug-in Based Caching Architecture Capable of Implementing Multiple Cache Regions Per Application", U.S. Appl. No. 11/024,554, filed Dec. 28, 2004—Non-Final Office Action mailed May 28, 2008, 7 pgs.

Gontmakher, Alex , et al., "Characterizations for Java Memory Behavior", *Paper*, Computer Science Department, Technion, (1997), 5.

Jagannathan, "High-Level Abstraction for Efficient Concurrent Systems", *NEC Research Institute*, Section 5.2, (Mar. 1994), 20.

Jordan, Mick , et al., "Extending a J2EE Server with Dynamic and Flexible Resource Management", *Paper*, Sun Microsystems, Inc, and School of Computer Science, University of Warterloo, Waterloo, ON, Canada, (Oct. 2004), 20.

Jordan, Mick , et al., "Scaling J2EE Application Servers with the Multi-Tasking Virtual Machine", Paper, Sun Microsystems, SMLI TR-2004-135, Jun. 2004, pp. 1-19, *Paper*, Sun Microsystems, SMLI TR-2004-135, 1-19.

JSR 107: JCACHE, "JSR 107: JCACHE-Java Temporary Caching API", http://.jcp.org/en/jsr/detail?id=107, (Mar. 20, 2001), 5.

Kuck, Norbert, et al., "SAP VM Container: Using Process Attachable Virtual machines to Provide Isolation and Scalability For Large Servers", Article, SAP AG, Walldorf, Germany, (2002), 1-2.

Loosco, Marcelo , et al., "A New Distributed Java Virtual Machine for Cluster Computing", *Notes in Computer Science*, Springer-Verlag, v. 2790, (2003), 1207-1215.

Luck, Greg , "Ehcache 1.0 released", http://www.theserverside.com/news, (Oct. 9, 2004), 1-5.

March, Andres , "OSCache: Change Log", http://www.opensymphony.com/oscache/wiki/Change%20Log.html, (Jan. 18, 2004), 1-11.

Marinescu, Floyd , "SpiritSoft Announces Availability of SpiritCache 2.0", http://www.theserverside.com/news.thread.tss?thread_id=18483, (Mar. 21, 2003), 1-5.

Movva, Sudhir , et al., "Transparent Clustered Database Failover Using JAVA", http://www.quest-pipelines.com/newsletter-v5/0604_A.html, (Apr. 2004), 11.

Nikolov, Nikolai, "Execution of modified byte code for debugging, testing and/or monitoring of object oriented software", 6570P041 U.S. Appl. No. 10/749,617, filed Dec. 30, 2003—Non-Final Office ction mailed Apr. 9, 2008.
Parnas, Dagfinn, "SAP Virtual Machine Container", https://weblogs.sdn.sap.com/pub/wlg/940, (Oct. 23, 2004), 1-4.
Penchikala, Srini, "J2EE Object-Caching Frameworks", http://www.javaworld.com/javaworld/jw-05-2004/jw-0531-cache_p.html, (May 31, 2004), Whole Document.
Penchikala, Srini, "Object Caching in a Web Portal Application Using JCS", http://www.onjava.com/pub/a/onjava/2003/caching.html, (Dec. 23, 2003), 1-18.
Petev, Petio G., et al., "First in First Out Eviction Implementation", 6570P255 U.S. Appl. No. 11/024,546, filed on Dec. 28, 2004, the Office Action mailed Apr. 6, 2007, claims as they stood in the application prior to the mailing of the Office Action an cl, (Dec. 28, 2004), Whole Document.
Petev, Petio, et al., "Least frequently used eviction implementation", U.S. Appl. No. 11/024,565, filed Dec. 28, 2004—Non-Final Office Action mailed Jun. 19, 2008, 20.
Petev, Petio G., "Programming Models For Storage Plug-Ins", U.S. Appl. No. 11/024,651, filed Dec. 28, 2004—Non-Final Office Action mailed Mar. 14, 2008, 11 pgs.
Petev, Petio G., et al., "Size Based Eviction Implementation", U.S. Appl. No. 11/024,591, filed on Dec. 28, 2004 the Office Action mailed Apr. 13, 2007, claims as they stood in the application prior to the mailing of the Office Action and claims pr, (Dec. 28, 2004), Whole Document.
Smits, Thomas, "Unbreakable Java-The Java Server that Never Goes Down", Article, SAP TechED, Nov. 2004, San Diego and Munich, (Nov. 2004), 1-5.
Stark, "Concurrent Programming in Java", *CS2 Advanced Programming in Java note 9, S2Bh*, (Jan. 3, 2002), 1-5.
Surdeanu, et al., ""Design and performance analysis of a distributed Java Virtual Machine"", *Parallel and Distributed Systems*, IEEE Transactions on vol. 13, Issue 6, (Jun. 2002), pp. 611-627.
Tullman, Patrick, et al., "Janos: A Java-Oriented OS for Active Network Nodes", Paper, Flux Research Group, University of Utah, (Mar. 2001), 14.
USPTO, "6570P189 FOA Mailed Aug. 14, 2008 for U.S. Appl. No. 11/025,378", Whole Document.
USPTO, "6570P214 OA Mailed Jun. 27, 2008 for U.S. Appl. No. 11/024,391", Whole Document.
USPTO, "6570P216 FOA Mailed Aug. 6, 2008 for U.S. Appl. No. 11/024,393", Whole Document.
USPTO, "6570P217 FOA Mailed Aug. 19, 2008, for U.S. Appl. No. 11/027,812", Whole Document.
USPTO, "6570P218 OA Mailed Sep. 4, 2008 for U.S. Appl. No. 11/026,323", Whole Document.
USPTO, "6570P222 FOA Mailed Sep. 17, 2008 for U.S. Appl. No. 11/024,392", Whole Document.
USPTO, "6570P222 OA Mailed Apr. 4, 2008 for U.S. Appl. No. 11/024,392", Whole Document.
USPTO, "Non-Final Office Action", U.S. Appl. No. 11/322,057, Whole document.
Wintergerst, Michael, et al., "Programming Models for Eviction Policies", U.S. Appl. No. 11/025,178, filed on Dec. 28, 2004, the Office Action mailed Feb. 1, 2007, claims as they stood in the application prior to the mailing of the Office Action, (Dec. 28, 2004), Whole Document.
Non-Final Office Action for U.S. Appl. No. 11/024,924, Mailed Apr. 24, 2009, 15 pages.
Non-Final Office Action for U.S. Appl. No. 11/024,394 dated Apr. 27, 2009; 33 pages.
Final Office Action for U.S. Appl. No. 11/024,524 dated Apr. 27, 2009; 21 pages.
Non-Final Office Action mailed Oct. 6, 2008 for U.S. Appl. No. 11/119,08, Whole Document.
Non-Final Office Action for U.S. Appl. No. 11/024,524 Mailed Nov. 12, 2008, 31 pages.
Non-Final Office Action for U.S. Appl No. 11/024,393 Mailed Nov. 26, 2008, 29 pages.
Non-Final Office Action for U.S. Appl. No. 11/012,803, Mailed Dec. 23, 2008, 22 pages.
Non-Final Office Action for U.S. Appl. No. 11/026,604, Mailed Dec. 30, 2008, 18 pages.
Final Office Action for U.S. Appl. No. 11/025,514, Mailed Jan. 8, 2009, 10 pages.
Non-Final Office Action for U.S. Appl. No. 11/322,596, Mailed Jan. 23, 2009, 12 pages.
Non-Final Office Action for U.S. Appl. No. 11/026,604, Mailed Jan. 27, 2009, 18 pages.
Office Action for U.S. Appl. No. 11/024,591, mailed Mar. 11, 2008, p. 15.
Office Action for U.S. Appl. No. 11/024,546, mailed Mar. 17, 2008, p. 18.
Office Action for U.S. Appl. No. 11/024,565, mailed Jun. 19, 2008, p. 22.
Non-Final Office Action for U.S. Appl. No. 11/024,924, Mailed Apr. 10, 2008, 16 pages.
Final Office Action for U.S. Appl. No. 11/024,924, Mailed Oct. 8, 2008, 9 pages.
Non-Final Office Action for U.S. Appl. No. 11/025,525, Mailed Feb. 19, 2009, 15 pages.
Notice of Allowance for U.S. Appl. No. 11/027,387, Mailed Feb. 23, 2009, 8 pages.
Notice of Allowance for U.S. Appl. No. 11/026,323, Mailed Feb. 25, 2009, 19 pages.
USPTO, "OA Mailed Oct. 3, 2008 for U.S. Appl. No. 11/027,387", Whole Document.
Notice of Allowance for U.S. Appl. No. 11/024,392, Mailed Mar. 12, 2009, 11 pages.
Final Office Action for U.S. Appl. No. 11/012,803, Mailed Jul. 22, 2008, 22 pages.
Final Office Action for U.S. Appl. No. 11/013,277, Mailed Aug. 7, 2008, 22 pages.
Non-Final Office Action for U.S. Appl. No. 11/013,277, Mailed Jan. 6, 2009, 22 pages.
Notice of Allowance for U.S. Appl. No. 11/024,393, Mailed Apr. 1, 2009, 8 pages.
Office Action for U.S. Appl. No. 11/025,200, Mailed Mar. 24, 2009, 14 pages.
Office Action for U.S. Appl. No. 11/025,514, Mailed Apr. 3, 2009, 12 pages.
Non-Final Office Action for U.S. Appl. No. 11/027,812, Mailed Apr. 2, 2009, 19 pages.
Bortvedt, Jerry, "Functional Specification for Object Caching Service for Java (OCS4J) 2.0", retrieved from http://jcp.org/en/jsr/detail?id=107, (Mar. 2001).
Cheung, KC, et al., "Lightweight Trace and Interpreter for Interprocess Timing Problems", IP.Com Journal, IP.Com Inc., West Henrietta, NY US, XP013096988, ISSN: 1533-0001, (Jun. 1, 1992), Whole Document.
EPO, "6570P210EP EP Search Report Mailed Jun. 4, 2008 for EP Patent Application 05027365.5-1225", (Jun. 4, 2008), Whole Document.
USPTO, "6570P171 OA Mailed Oct. 29, 2008 for U.S. Appl. No. 11/149,562", Whole Document.
USPTO, "6570P189 FOA Mailed Aug. 22, 2007 for U.S. Appl. No. 11/025,378", Whole Document.
USPTO, "6570P189 OA Mailed Jan. 21, 2009 for U.S. Appl. No. 11/025,378", Whole Document.
USPTO, "6570P189 OA Mailed Apr. 19, 2007 for U.S. Appl. No. 11/025,378", Whole Document.
Viswananthan, D., et al., "Java Virtual Machine Profiler Interface", IBM Systems Journal IBM USA, vol. 39, No. 1, XP002481425, ISSN: 0018-8670, (2000), 82-95.
Wolczko, Mario, "Using a Tracing Java Virtual Machine to Gather Data on the Behavior of Java Programs", Internet Citation, XP002375976, http://research.sun.com/people/mario/tracing-jvm/tracing.pdf, (Retrieved on Apr. 6, 2006), Whole Document.

* cited by examiner

| JAVA FCA LAYER FOR JAVA (JFCA) |
| 1012 |

| C FCA LAYER FOR C (C FCA) |
| 1010 |

| FCA COMMUNICATION LAYER/API |
| 1008 |

| MEMORY PIPES |
| 1006 |

| SEMAPHORES |
| 1004 |

| OPERATING SYSTEM |
| 1002 |

FIG. 10B

SOCKET-LIKE COMMUNICATION API FOR C

BACKGROUND

1. Field of the Invention

This invention relates generally to data processing. More particularly, an embodiment relates to a system and method for performing data processing using shared memory and socket-like communication application programming interface.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the JAVA 2 PLATFORM ENTERPRISE EDITION™ (J2EE) standard, the Microsoft® .NET™ standard and/or the ADVANCED BUSINESS APPLICATION PROGRAMMING™ (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

In recent years, as business application development projects have grown larger and more diversified, integration of business applications in terms of people, information, and processed is becoming increasingly important. SAP® NetWeaver™ was developed and presented by SAP AG with core capabilities to provide a solution for the integration of people, information, and processes.

However, the integration of people, information, and process is resulting in an ever increasing demand for high-level planning, maintenance, and administration, which in turn, requires the underline architecture and environment to conform to, for example, platform independence, inter-process communication, increased security, development versioning, multi-user possibility, shared memory, and efficient class-loading. For example, it would be useful to have an architectural environment that provides increased robustness, improved integration, better monitoring, reduced memory footprint, decreased internal threads, faster session failover, and shared memory.

SUMMARY

A system and method are described for performing data processing using shared memory and socket-like application programming interface. In one embodiment, a plurality of handles is employed and associated with a plurality of processes. The plurality of handles may serve as communication end-points for communication of data. Further, an application programming interface is employed to present the plurality of handles as the application programming interface for sockets for facilitating the communication of data compatible with a programming language. In one embodiment, the programming language includes C, C++, C#, VISUAL BASIC™, JAVA™, and the like.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

FIGS. 10A and 10B are block diagrams illustrating embodiments of the layering of the Fast Channel Architecture;

DETAILED DESCRIPTION

Described below is a system and method for employing performing data processing using shared memory and socket-like communication application programming interface. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), flash memory, or another type of media/machine-readable storage medium suitable for storing electronic instructions. Moreover, various embodiments of the present invention may also be downloaded as a computer program product, wherein the program may be transferred from a remote computer to a requesting computer by way of data signals.

Figure 1A:
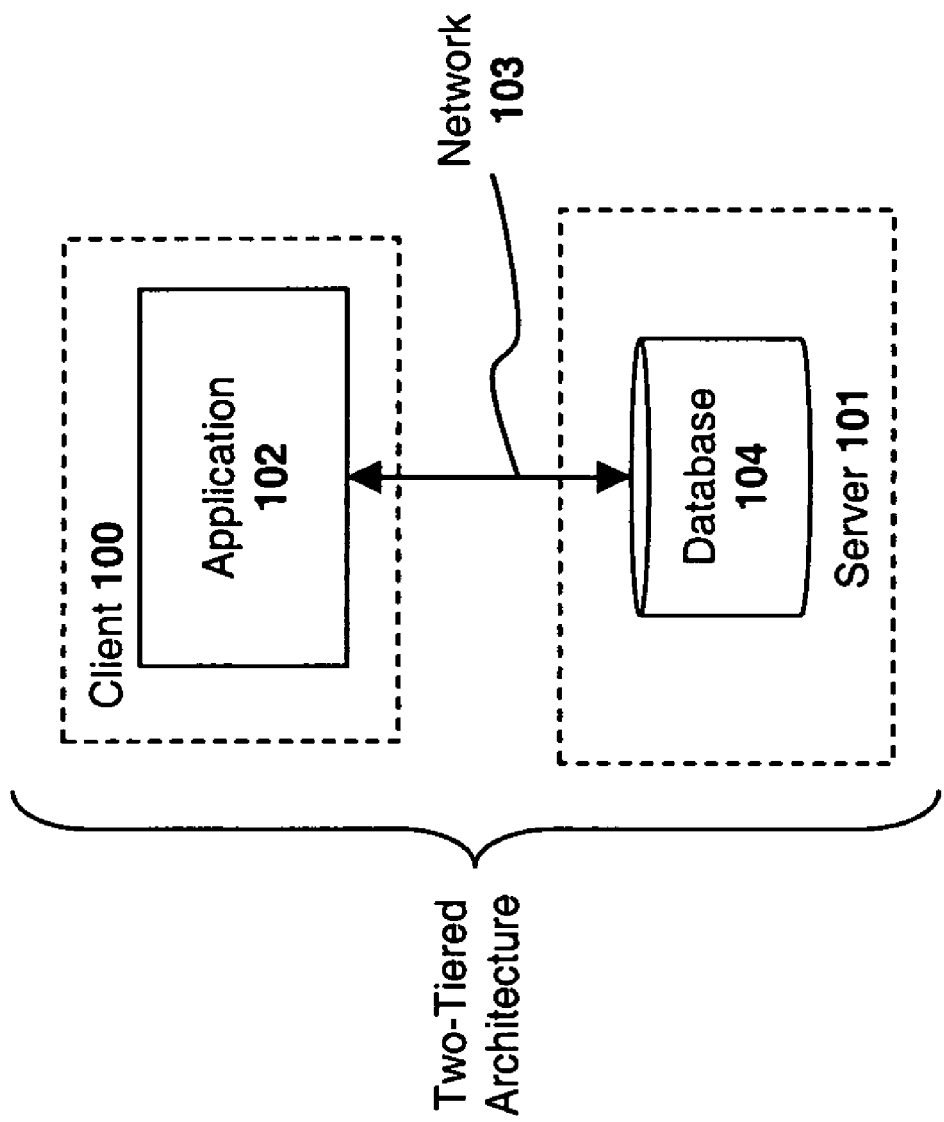
FIG. 1A is a block diagram illustrating a prior art two-tier client-server architecture.
Figure 1B:
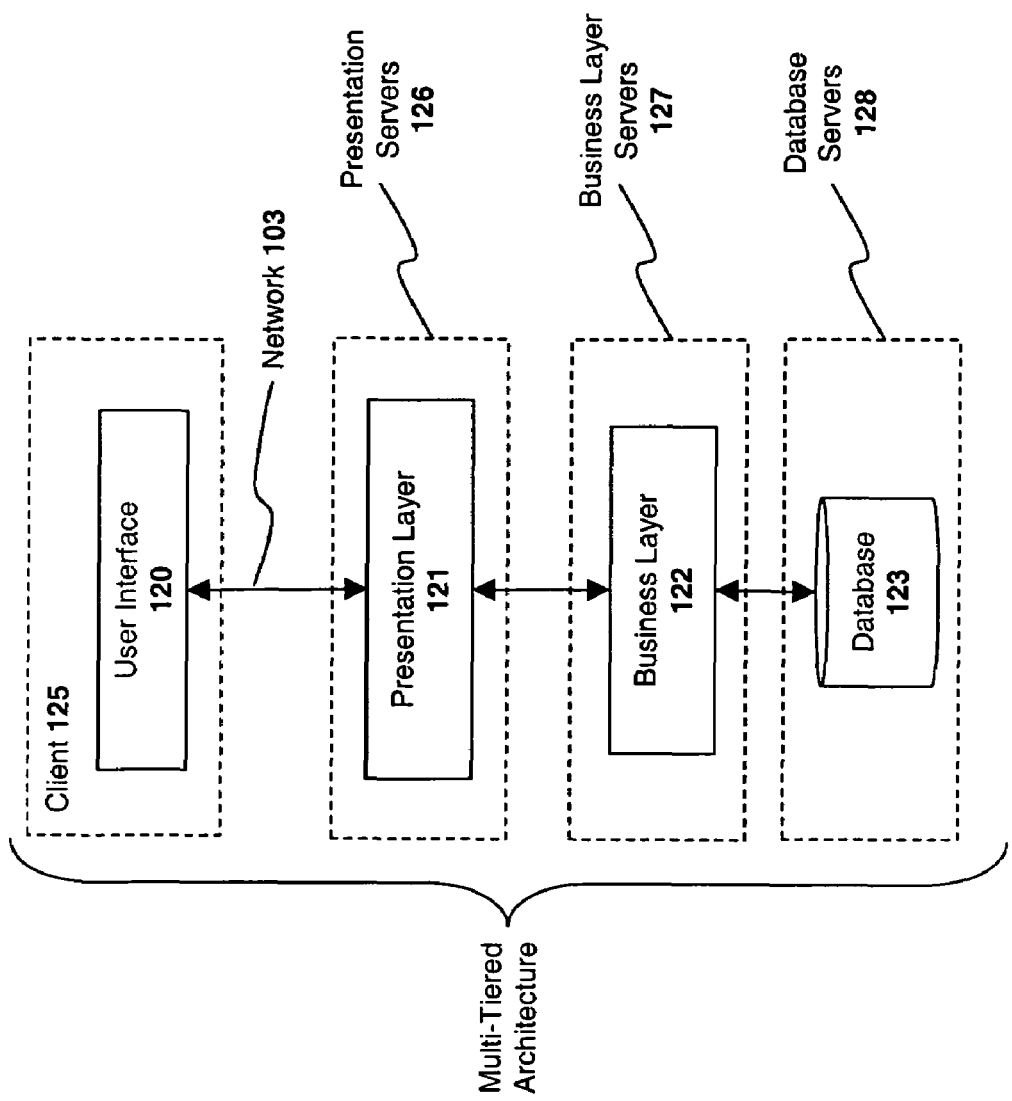
FIG. 1B is a block diagram illustrating a prior art multi-tier client-server architecture.
Figure 1C:
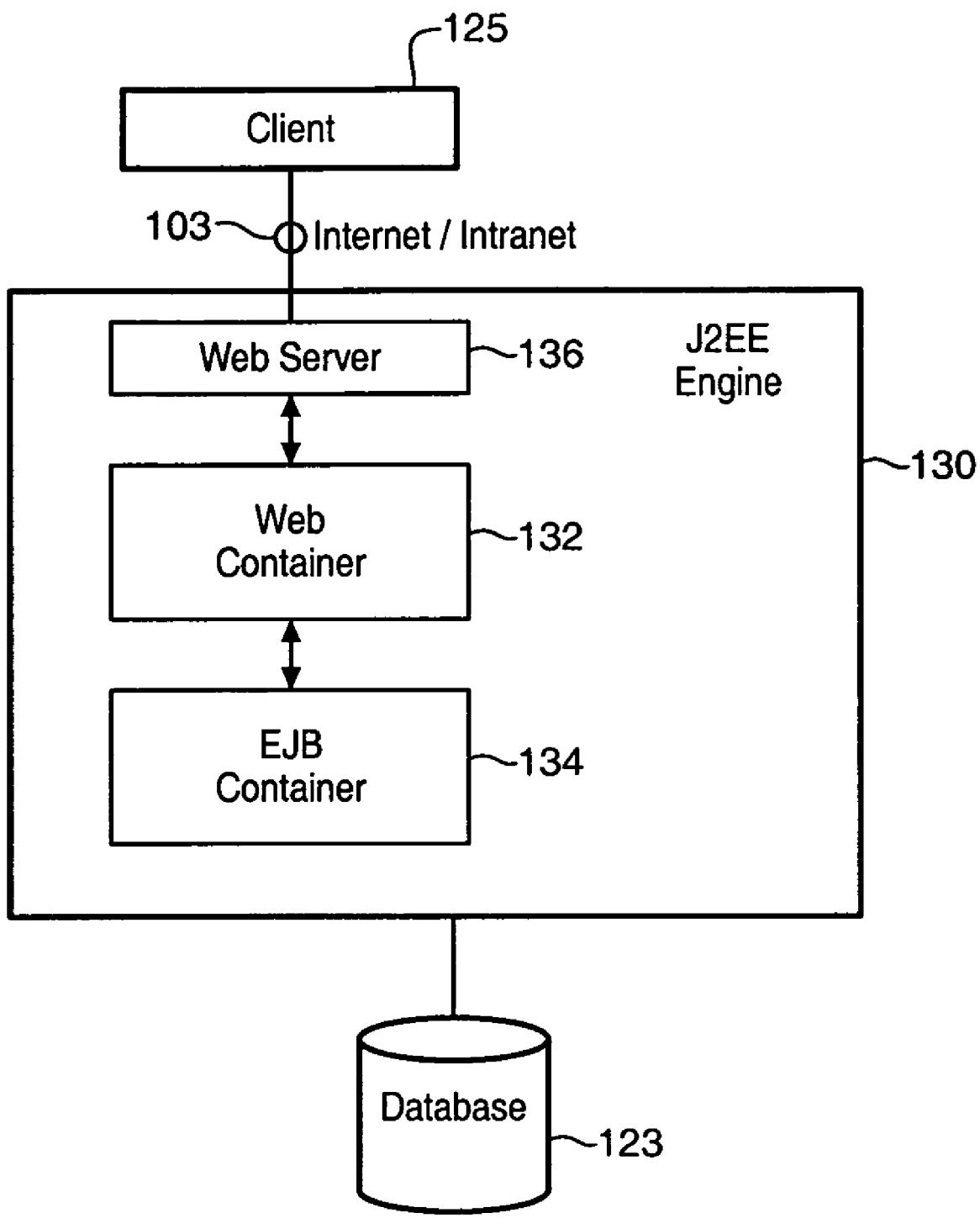
FIG. 1C is a block diagram illustrating a prior art J2EE environment.
Figure 2:
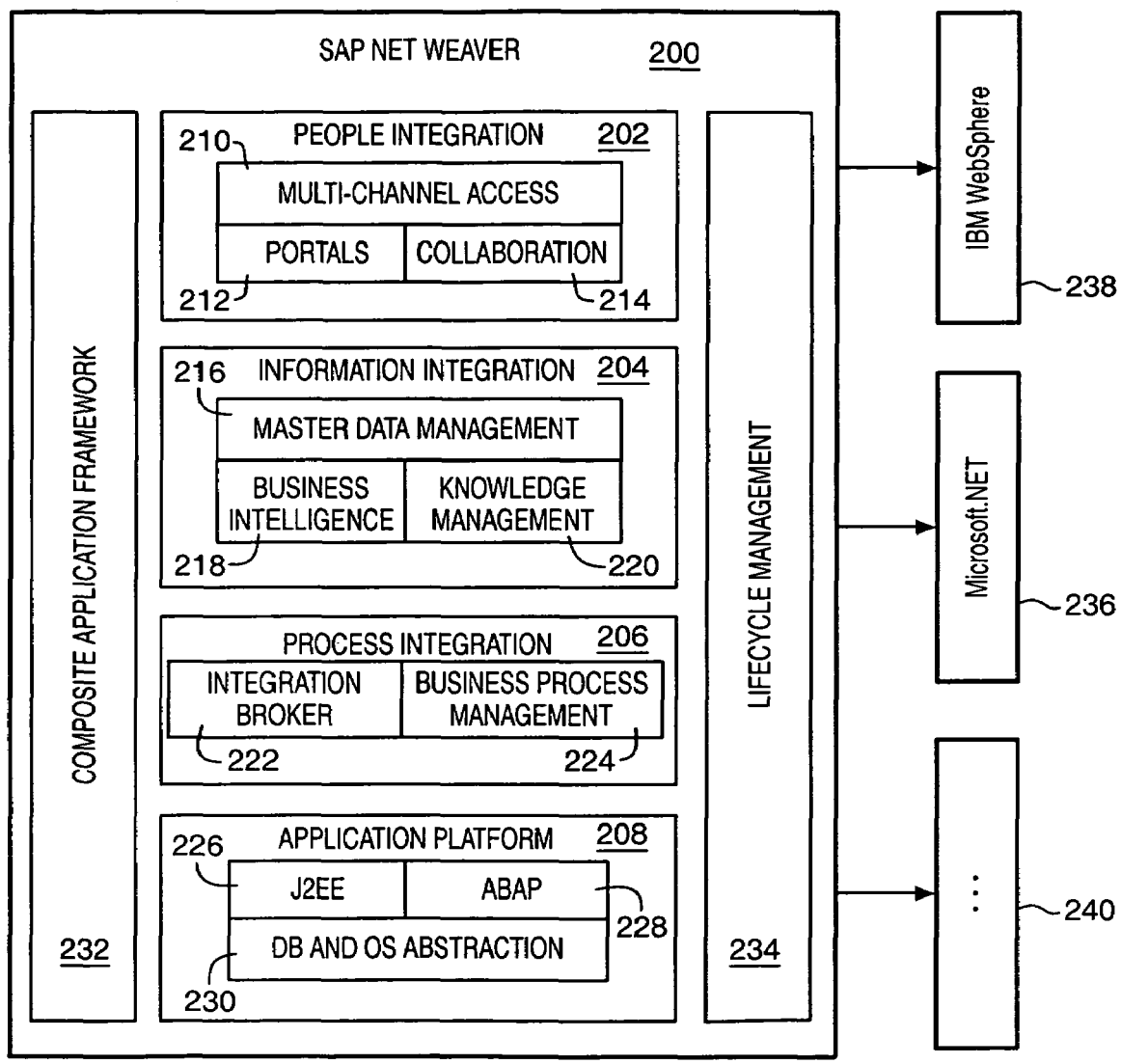
FIG. 2 is a block diagram illustrating an embodiment of the core components of SAP NetWeaver architecture.

FIG. 2 is a block diagram illustrating an embodiment of the core components of SAP NetWeaver architecture 200. As illustrated, the architecture 200 comprises various SAP platforms that are merged together to provide the integration of people, information, and processes in one solution. From an organizational point of view, the architecture 200 includes the following four core areas: people integration 202, information integration 204, process integration 206, and application platform 208. People integration 202 is performed using a portal solution 212 and a platform to work in collaboration 214. Users are provided a multi-channel access 210 to ensure mobility. Examples of the portal solution 212 include SAP Enterprise Portal, SAP Mobile Engine, and Collaboration Package for SAP Enterprise Portal.

Information integration 204 refers to converting information into knowledge quickly and efficiently. Information integration 204 provides efficient business intelligence 216 and knowledge management 220 using SAP products like Business Information Warehouse (BW) and Knowledge Management (KM). Further, consolidation of master data management 218 beyond system boundaries is performed using SAP's Master Data Management (MDM). Process integration 206 refers to optimized process management using integration broker or SAP exchange infrastructure 222 and business process management 224 techniques. Examples of products to perform process integration 206 include Exchange Infrastructure (XI) and Business Process Management (BPM).

Application platform 208 refers to SAP's Web Application Server (Web AS), which is the basis for SAP applications. Web AS, which may be independent of the database and operating system 230, includes a J2EE engine 226 in combination with an already present ABAP engine or instance 228 to further enhance the application platform 208. The architecture 200 further includes a composite application framework 232 to provide various open interfaces (APIs) and a lifecycle management 234, which is an extension of the previous Transport Management System (TMS). As illustrated, the architecture 200 further provides communication with Microsoft .NET 236, International Business Machine® (IBM) WebSphere™ 238, and the like 240.

Figure 3:
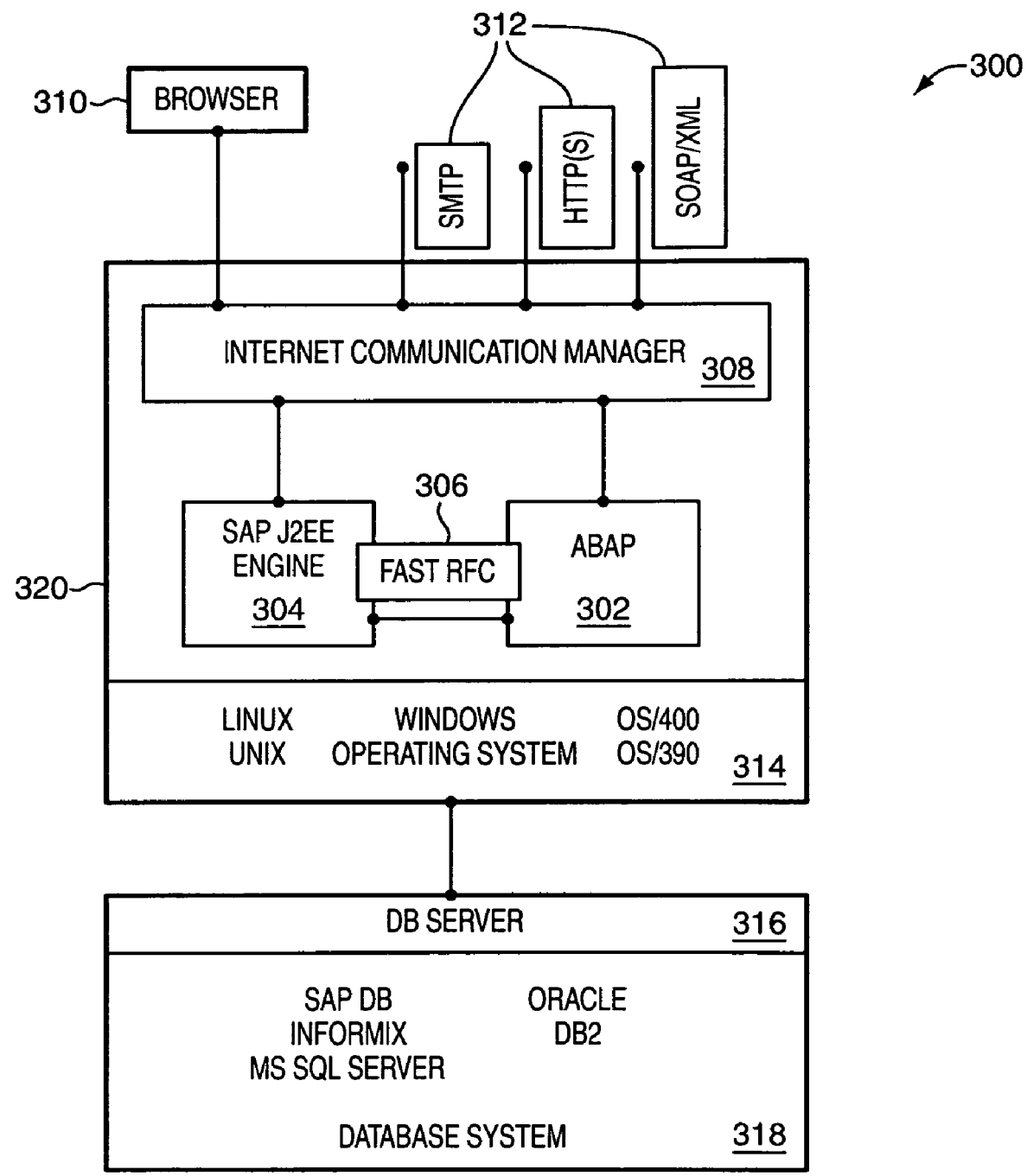
FIG. 3 is a block diagram illustrating an embodiment of an architecture having a Web Application Server.

FIG. 3 is a block diagram illustrating an embodiment of an architecture 300 having a Web Application Server 320. The architecture 300 serves as an application platform (e.g., application platform 208 of FIG. 2) for SAP NetWeaver and other SAP products. As illustrated, the architecture 300 includes a Web AS 320 having an ABAP engine 302, which provides the ABAP development and runtime environment, with the dependability, scalability, and inter-process independence of operating systems 314 and database systems 318. The operating system 314 includes LINUX, UNIX, Windows, OS/390, OS/400, and the like. The database system 318 includes SAP database (SAP DB), Informix, Oracle, DB2, and the like. The database system 318 is based on a database server 316, such as Microsoft Sequential Query Language (MS SQL) server.

The Web AS 320 having the ABAP engine 302 is further enhanced by including a J2EE engine 304. The J2EE engine 304 is in communication with the ABAP engine 302 via a fast Remote Function Call (RFC) connection 306. The two engines 302-304 are further in communication with an Internet Communication Manger (ICM) 308. The ICM 308 is provided for handling and distributing queries (e.g., Internet queries) to various individual components of the architecture 300. The architecture 300 further supports a browser 310, such as Microsoft Internet Explorer, Netscape Navigator, and other modified variations of mobile end devices, such as personal digital assistants (PDAs), pocket computers, smart cell phones, other hybrid devices, and the like. The Web AS 320 also supports various protocols and standards 312, such as HyperText Markup Language (HTML), eXtensible Markup Language (XML), Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 4:
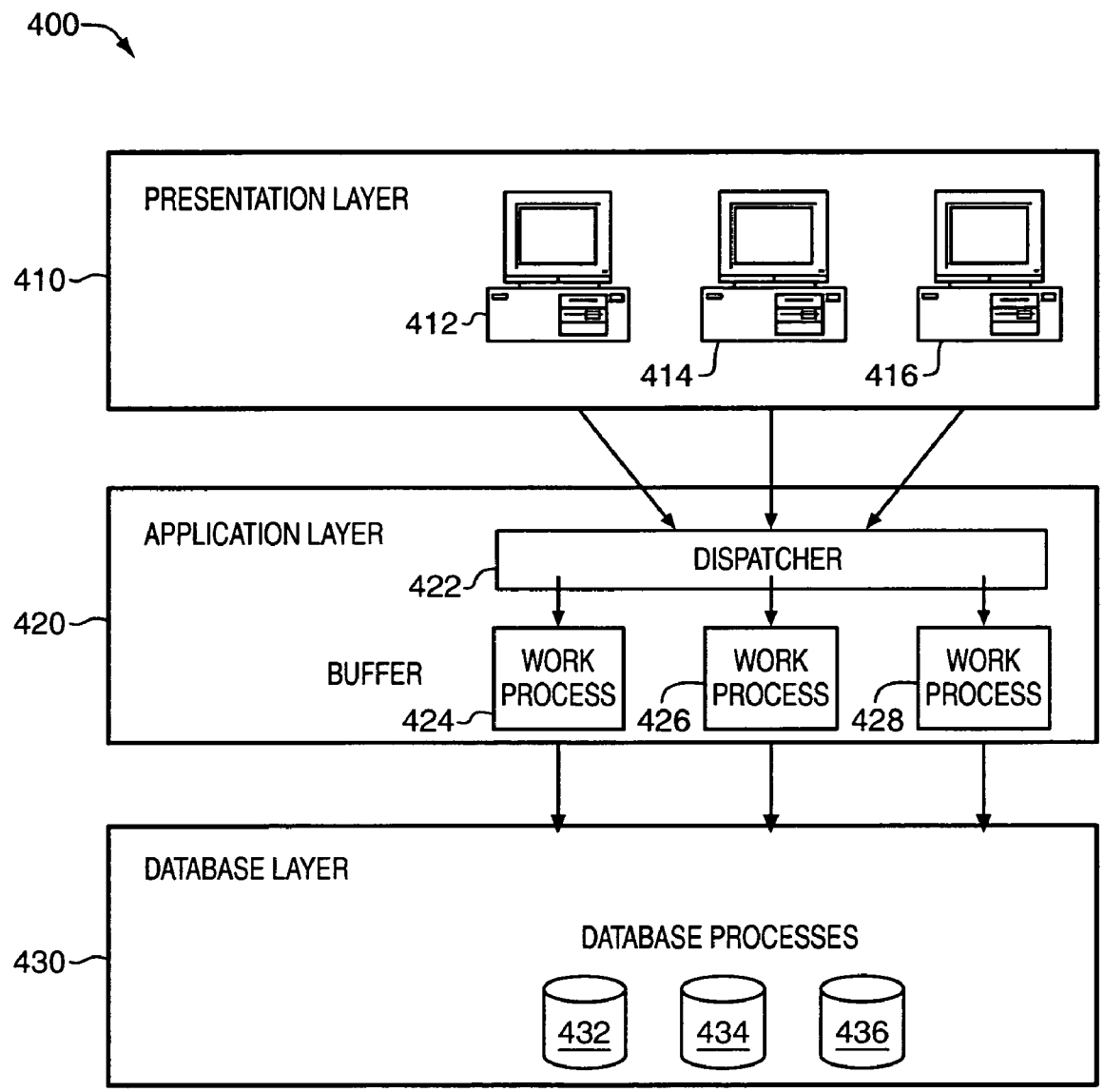
FIG. 4 is a block diagram illustrating an embodiment of a Web Application Server-based architecture having multiple layers.

FIG. 4 is a block diagram illustrating an embodiment of a Web Application Server-based architecture 400 having multiple layers 410, 420, 430. As illustrated, the three layers or levels 410, 420, 430 include a presentation layer (or distributed services or manager or user or client layer) 410, an application agent layer (or agent layer) 420, and a database layer (or instrumentation layer) 430. Various components and elements at each of layer 410, 420, 430 of the architecture 400 are, directly or indirectly, interconnected via a network (e.g., a Local Area Network (LAN)). Alternative embodiments of the architecture 400 may include more or fewer layers.

The presentation layer 410 serves as an interface between various applications and users or clients 412-416. Here, the clients are illustrated as workstations or terminals 412-416 that are used to collect and gather user input and send it to the application layer 420 via a network connection. The network connection may be a wired or wireless connection to a LAN, a Wide Area Network (WAN), a Metropolitan Area Network (MAN), an intranet, and/or the Internet. The terminals 412-416 include personal computers, notebook computers, personal digital assistants, telephones, and the like. In one embodiment in which the network connection connects to the Internet, one or more of the user terminals 412-416 may include a Web browser (e.g., Internet Explorer or Netscape Navigator) to interface with the Internet.

The presentation layer 410 allows the end user to interact with the relevant application using a GUI, such as the SAP GUI, which is a universal client widely used for accessing SAP R/3 or mySAP functions. The GUI works as a browser and offers easy access to various SAP functions, such as application transactions, reports, and system administration functions. The SAP GUI, for example, is available in three different formats, each of which having its own unique selling point and is suited to a particular user. The three formats include SAP GUI for Windows®, SAP GUI for HTML, and SAP GUI for JAVA.

The presentation layer 410 may also includes various management applications, such as a JAVA Management Extension (JMX)-compliant management application, a JMX manager, and/or a proprietary management application. The management applications include one or more graphical management applications, such as a visual administrator, operating to, for example, retrieve and display information received from the application layer 420 and/or the database layer 430. The visual administrator includes a monitor viewer to display such and other information. The monitor viewer includes a GUI-based or Web-based monitor viewer. Management applications include third party tools, such as file systems, to store information.

The application layer 420 includes various application servers and computing devices to perform data processing. The application layer 420 includes a dispatcher 418, which refers to the central process on the application layer 420 for processing transactions. For example, the dispatcher 422 is used to distribute the request load to individual work processes 424-428, organize communication between the work processes 424-428, and establish connection to the presentation layer 410. For example, when a user makes processing entries from his computer using the menu on the presentation layer 410, the entries are converted into a special format (e.g., GUI protocol) and forwarded to the dispatcher 422. The dispatcher 422 then places this request in a dispatcher queue. The queue is then used to free work processes 424-428 that carry out the processing. The application layer 420 may be implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. The management techniques described herein are used to manage resources within a "cluster" of server nodes. An exemplary cluster architecture is described below with respect to FIGS. 12-13. However, the underlying principles of the invention are not limited to any particular application server architecture.

The database layer 430 is used to optimize the data access without the being dependent on the underlying database and the operating system. The database independence is achieved using open standards, such as JAVA Database Connectivity (JDC). The presentation layer 410 is where the user interacts with the relevant application, which is then executed at the application layer 420, while the data processing 432-436 is managed at the database layer 430. The database layer 430 may include one or more database management systems (DBMS) and data sources. Furthermore, the database layer 430 is compatible with both the ABAP and J2EE environments and allows the two environments to communicate with each other. For example, the functions of ABAP (e.g., Open SQL for ABAP) are transferred to the functions of J2EE (e.g., Open SQL for JAVA) using a variety of APIs.

The database layer 430 may include one or more database servers, EJB servers, old systems, and mySAP components. The clients at the presentation layer 410 may access one or more of the applications via standalone JAVA programs and programs that help access an application via, for example, using Internet Inter-Object Request Broker Protocol (IIOP)/

Common Object Request Broker Architecture (COBRA) written using any number of programming languages (e.g., –C, C, and C++).

The J2EE environment may also include various J2EE containers that are associated with various J2EE services and APIs, which include JAVA Naming Directory Interface (JNDI), JAVA Database Connectivity (JDBC), J2EE connector Architecture (JCA), Remote Method Invocation (RMI), JAVA Transaction API (JTA), JAVA Transaction Service (JTS), JAVA Message Service (JMS), JAVA Mail, JAVA Cryptography Architecture (JCA), JAVA Cryptography Extension (JCE), and JAVA Authentication and Authorization Service (JAAS). The J2EE services further include EJB_service, servlet_JSP, application_client_service, connector_service to provide (J2EE containers, namely) EJB containers, Web containers, application client containers, and connector containers, respectively.

Figure 5:
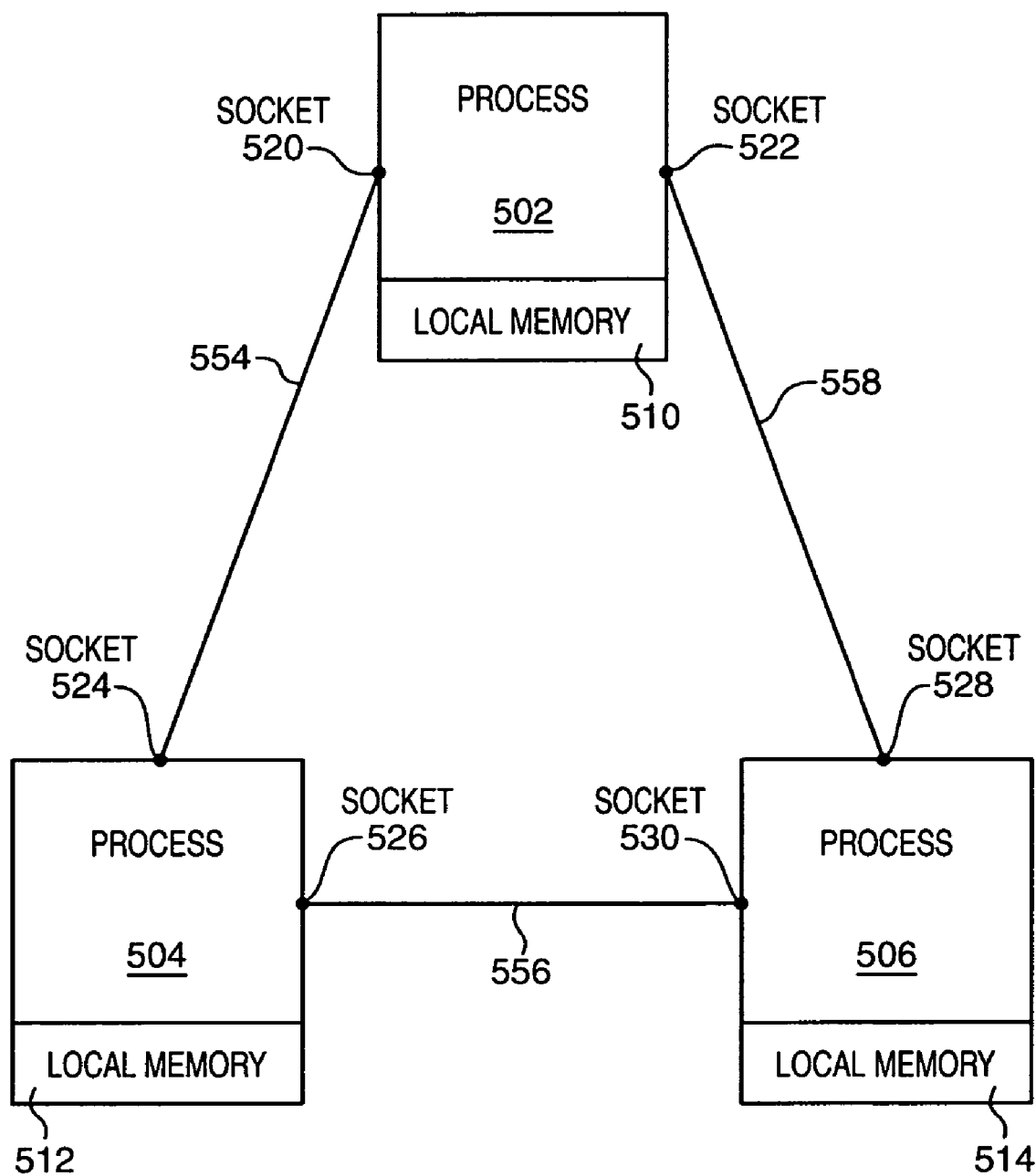
FIG. 5 is a block diagrams illustrating a network-based communication architecture for performing data processing using sockets with an Application Programming Interface for socket communication.

FIG. 5 is a block diagrams illustrating a network-based communication architecture 500 for performing data processing using sockets 520-530 with an API for socket communication. Computers typically communicate with each other via one or more networks without the advantage of having common shared memory. In the illustrated network-based communication architecture 500, a local memory 512-514 is assigned to and corresponds with each of the processes 502-506 for access to facilitate data processing. Furthermore, the sockets 520-530 are provided as interfaces that serve as communication mechanism to act as endpoints for sending and receiving data between various processes 502-506. Each socket may be associated with a process 502-506 and may exist within a communication domain as an abstraction to bundle properties of processes 502-506 communicating through the sockets 520-530.

As illustrated, in a network-based architecture 500, the basic building block for communication is the sockets 520-530 associated with each of the processes 502-506. The sockets 520-530 exist within the communication domain, which serves as an abstraction to bundle properties of processes 502-506 communicating through the sockets 520-530. There are various types of sockets 520-530 that communication architectures 500 can adopt. Some examples of the various types of sockets 520-530 include stream sockets, datagram sockets, raw sockets, and sequenced packet sockets. Stream sockets provide bi-directional, reliable, sequenced, unduplicated flow of data. Message boundaries are not visible for stream sockets. Datagram sockets support a two-way flow of messages. A datagram socket may receive messages in a different order from the sequence in which the messages were sent. Record boundaries are visible for datagram sockets. Raw sockets provides access to the underlying communication protocols. Sequenced packet sockets are similar to stream sockets, with the exception that record boundaries are preserved.

A socket 520-530 is created with a system call and terminated with a system call once a process 502-506 has finished using the socket. The sockets 520-530 are created and maintained on the OS level of the architecture 500. The sockets 520-530 are used to make the inter-process communication similar to file Input/Output (I/O), primarily because the network protocols are typically more complex than conventional I/O devices. Various network protocols (e.g., socket interface, TCP/IP) are used to exchange information in a conventional computer system without the use of a shared memory.

A process 502-506 refers to a task being run by a computer, which is often simultaneously with several other tasks. Many of the processes 502-506 exist simultaneously with each of them taking turns on the central processing unit (CPU). Typically, the processes 502-506 include operating system (OS) processes that are embedded in the operating system. The processes 502-506 consume CPU as opposed to the memory 510-514 that takes up space. This is typically the case for both the processes that are managed by the operating system and those processes that are defined by process calculi. The processes 502-506 further include specialized processes, such as ABAP work processes and J2EE worker nodes.

The operating system works to keep the processes 502-506 separated and allocates the resources to help eliminate the potential interferences of the processes 502-506 with each other when being executed simultaneously. Such potential interferences can cause system failures. Further, the operating system may also provide mechanisms for inter-process communication to enable processes to interact in safe and predictable manner. Typically, an OS process 502-506 consists of memory (e.g., a region of virtual memory for suspended processes), which contains executable code or task-specific data, operating system resources that are allocated to each of the processes which include file descriptor (for UNIX) and handles (for Windows), security attributes (e.g., process owner and the set of permissions), and the processor state (e.g., content of registers, physical memory addresses), which is stored in the actual registers when the process is executing.

The ABAP work processes and the J2EE worker nodes OS processes 502-506 are considered specialized processes that contain the attributes and behavior of the a typical OS process and are created, scheduled, and maintained by the operating system. For example, the ABAP work processes are specialized in that they are used to execute the ABAP-based transactions, and the J2EE worker nodes are specialized in that they are used to execute the JAVA-based transactions.

Having assigned individualized memory 510-514 to each of the processes 502-506 provides a relatively inefficient computing, which lacks robustness as the processes 502-506 do not communicate with each other and have to access the local memory 510-514 for information or data (e.g., an update or a datagram). Furthermore, such network-based communication using various network connections 554-558 also causes the data processing transactions to be time-consuming and less secure. For example, a typical data processing transaction may include retrieving of the data from one local memory 510-514, flowing of the data through various protocols (e.g., Transmission Control Protocol (TCP), User Datagram Protocol (UDP)), addresses (e.g., Internet Protocol (IP) address) and operating systems, before reaching its destination at another local memory 510-514.

Figure 6:
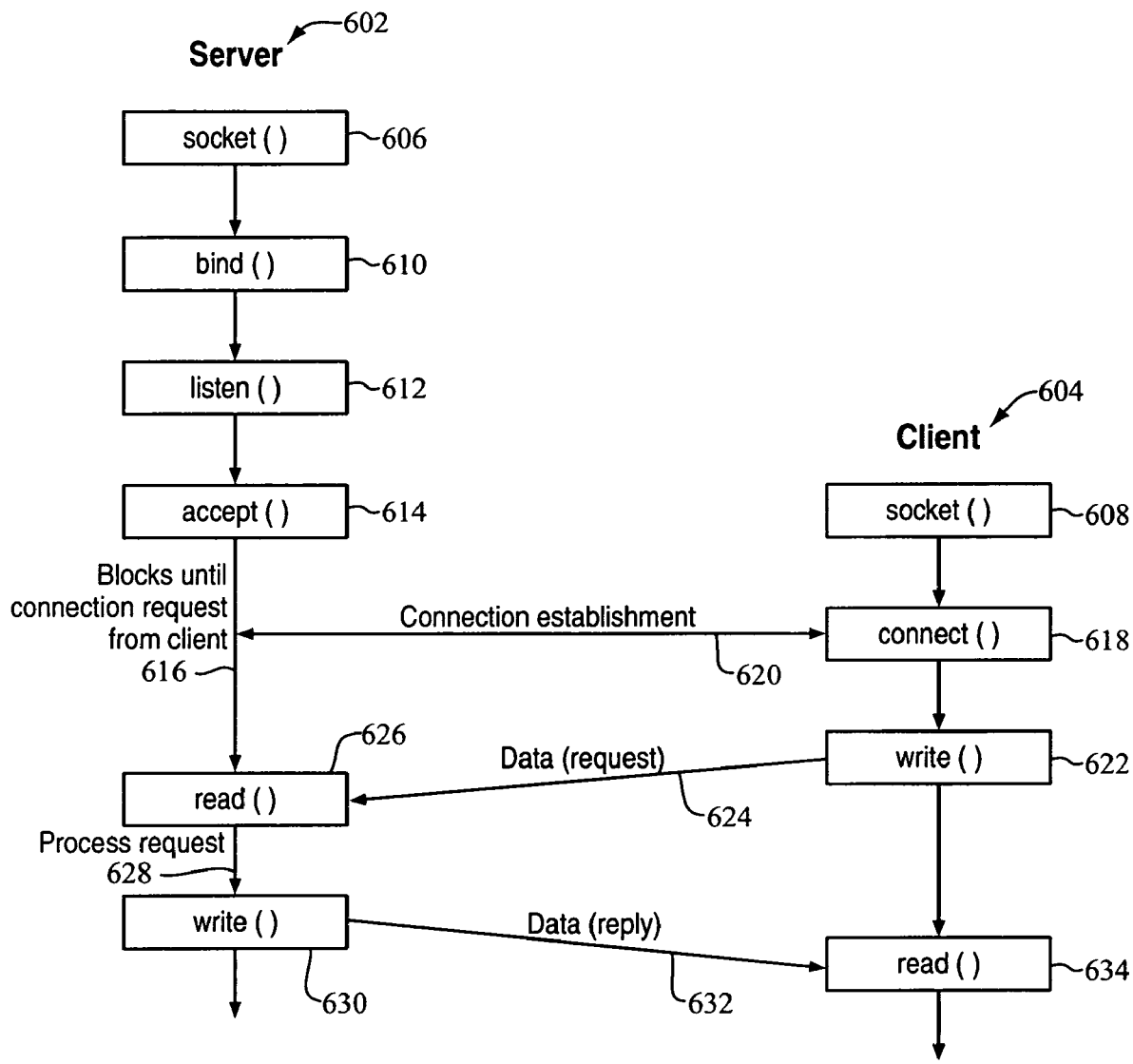
FIG. 6 is a diagram illustrating an embodiment of a transaction sequence for socket calls.

FIG. 6 is a diagram illustrating an embodiment of a transaction sequence for socket calls. At the server 602, data structure for a socket is established 606. The socket is then attached to a hostname and port 610. The server 602 then makes the port available to other processes to receive connections by facilitating listening 612. At the client 604, data structure for the socket is established 608. A connection is offered 618 to the server (hostname and port) 602. This is typically done after the server 602 has made the port available by binding 610 and listening 612.

The server 602 accepts the connection 614 offered by the client 604. Stated differently, the server 602 gets a port and a socket to use for this client 604. The server 602 blocks the connection 616 until connection request from the client 604 is received. The connection is established 620 between the server 602 and the client 604. The client 604 writes the request data 622, which results in sending of the request data 624. The reads the request data 626, which results in receiving of the request data. The request is then processed 628 at the server 602. The server 602 then writes the response data 630, which results in sending of the response data 632 to the client 604. The client 604 then reads the response data 634. The connection may then be closed between the server 602 and this client 604 if no longer necessitated.

Figure 7:
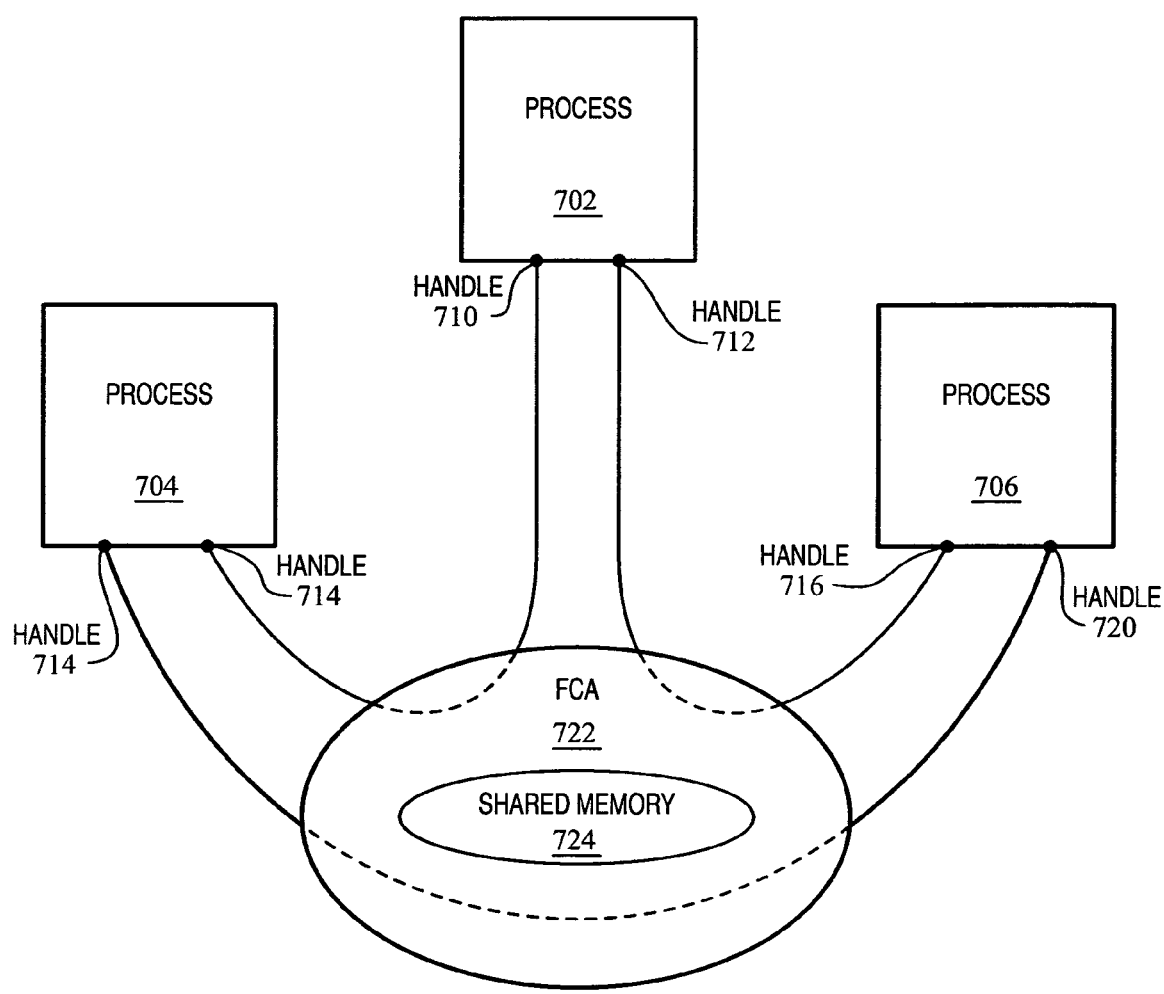
FIG. 7 is a block diagram illustrating an embodiment of a Web Application Server architecture having a Fast Channel Architecture using handles with a C Application Programming Interface for Fast Channel Architecture communication.

FIG. 7 is a block diagram illustrating an embodiment of a Web Application Server architecture (architecture) 700 having a Fast Channel Architecture (FCA) 722 using handles 710-720 with a C API for FCA communication. It is to be noted that the programming language C is being used here merely as an example and for clarity. The API for FCA communication can be used with other programming languages, such as a C-based API for C, a C++-based API for C++, a C#-based API for C#, a VISUAL BASIC-based API for VISUAL BASIC, a JAVA-based API for JAVA, and the like.

In one embodiment, the FCA 722 includes shared memory 724 to facilitate bi-directional communication between independent processes 702-706. The processes 702-706 include OS processes including ABAP work processes and J2EE worker nodes. The shared memory 724 at the FCA 700 provides a relatively fast, efficient, scalable, reliable, and secure communication between various processes 702-706 on the same physical host. The shared memory-based bi-directional communication utilizes the centralized shared memory 724 for the processes 702-706 to share and access and thus, eliminating the need for having an individualized local memory and for communicating via a network. Furthermore, the use of the shared memory 724 provides for a copy-free communication, high bandwidth, low latency, and fixed size communication buffers.

The processes 702-706 refer to tasks embedded in the operating system. For example, each time a client initiates a program or a document (e.g., opening Microsoft Word®), a request is placed with the operating system regarding commencing the task of opening the document for the client. Several of such processes 702-706 can be performed simultaneously in the CPU by taking turns. Typically, an operating system provides the isolation of such processes 702-706, so they are less likely to interfere with each other, such as when there is a crashed process, such as process 702, none of the other processes, such as processes 704-706, are affected by it and so the potential system failure is avoided. For example, the operating system can increase isolation and robustness by allocating one process 702-706 for each user session, and running a VM for that user session within the allocated process 702-706. However, in some situations (e.g., when there are a large number of user sessions), such operating system scheduling and allocation can add to the system overhead and consume valuable resources, such as time and space.

The processes 702-706 may contain some memory (e.g., a region of virtual memory for suspended processes which contains executable code or task-specific data), operating system resources that are allocated to such processes 702-706 (such as file descriptors, when referring to UNIX, and handles, when referring to Windows), security attributes, such as process owner and the process' set of permissions, and the processor state, such as the content of registers, physical memory addresses, etc.

Various enterprise servers and other large servers are considered request processing engines for processing large numbers of small user requests associated with user sessions. The user requests lead to the creation of processes 702-706, which refer to processing of such user requests. The processing of the requests usually involves the running of a user code (e.g., JAVA servlets or EJBs) in a runtime system (e.g., a JAVA virtual machine (JVM)) executing on a server. In such a server, scalability can be achieved by using multiple threads, such as a multi-threaded VM, to process requests corresponding to a number of user sessions. However, running a large number of user sessions can be relatively cumbersome and wasteful of valuable resources.

In one embodiment, the shared memory 724 can provide a common access and a buffer for the process-attachable VMs, the OS processes 702-706 including ABAP work processes and J2EE worker nodes, as well as dispatcher processes. It is to be noted that the ABAP work processes at the ABAP engine are considered specialized processes that are used for processing the OS processes 702-706 with specialized functionality. The work processes have the attributes and behavior that are also common with the OS processes 702-706 and they may be created, scheduled, and maintained by the operating system. For example, the ABAP work processes are to execute ABAP transactions, while the J2EE worker nodes, also regarded as specialized processes having similar attributes as the processes 702-706, are to execute the JAVA code.

Having introduced the FCA 722 to the architecture 700 facilitates an executable program (e.g., a program running on an OS process 702-706 executing the code) to use the FCA functionalities by binding the FCA library at the time of development and by calling the API for FCA communication in a programming language (e.g., C or JAVA). For C, the API includes a C API which includes different classes, but uses similar semantics as socket API to provide socket-like API for ease in communication and yet, having the benefits of a C API. For example, at runtime, the executable program operates as a process 702-706 in the operating system, such as when a program (e.g., MS Word or Excel) is started several times, which creates several OS processes 702-706 associated with one program that are performed using the FCA functionalities. In one embodiment, the FCA 722 may remain independent of a particular programming language (e.g., ABAP or JAVA) or a particular operating system (e.g., UNIX or Windows). The FCA functionalities (e.g., ABAP statements, transactions, input/output processing, etc.) may be achieved by coding such functionalities in the program. Stated differently, the program, when running, is executed as an OS process 702-706 and as such it performs various tasks, such as reading/writing data, processing data, and accessing the FCA functionalities.

In one embodiment, having the shared memory 724 helps eliminate the necessity for local memory or individually dispersed memory for performing processes 702-706 and for communicating data. Stated differently, the shared memory 724, as opposed to a local memory using a network connection, is used to create a buffer (e.g., for receiving and transmitting data) for various processes 702-706. For example, once a request to perform a particular task is received at the server from a client/user session, a process 702-706 to be performed is initiated as the request is created. A request queue is created at the shared memory 724 and the recently-created request is then placed in the request queue. In one embodiment, the dispatcher then determines the availability of various work processes and, based on such availability, assigns the request to the available work process to handle. The work process performs the corresponding process 702-706 to satisfy the client request. The satisfying of the request may include performing the requested task and providing the requested information or response data back to the client via the shared memory 724. In another embodiment, if the dispatcher is not used, the ICM may possess the functionalities of the dispatcher and assign the request to, for example, the available ABAP work process or J2EE worker node. The ABAP-related requests are sent to the ABAP work processes and the JAVA-related requests are sent to the J2EE worker nodes. Having the shared memory 724 provided by the FCA 722 not only allows a copy-free transmission of the data, but also eliminates the potential of the data being lost due to connection or network failures. Furthermore, using a single shared memory 724 allows the various tasks (e.g., OS processes 702-706) to run on a single local host, which in turn, provides a secure transmission of data. In one embodiment, the shared memory 724 includes memory pipes that are used bi-directionally and are created at startup along with initialization of the FCA 722.

Furthermore, the shared memory 724 at the FCA 722 is low on buffers, which allows for creating and connecting of the queues rather than solely relying on retrying the same queues. Having the shared memory 724 reduces administrative costs, while increasing consistency and easing communication between various processes 702-706. Various entities at the shared memory 724 may include data, datagrams, application update information, strings, constants, variable, objects that are instances for a class, runtime representations of a class, and classloaders that are used to load class runtime representatives.

In one embodiment, the architecture 700 employs FCA handles 710-720 as communication end-points. The handles 710-720 are regarded as an entity at the FCA level for providing communication. Although the handles 710-720 are not sockets as they have different classes, they act socket-like by having similar semantics, which makes application migration from sockets to FCA connections via the handles 710-720 relatively easy. The handles 710-720 are created, maintained, and used at the application layer of the architecture 700 and not necessarily at the OS level where the sockets are created. In one embodiment, the FCA handles 710-720 provide greater performance, reliability, robustness, security, and failover handling, while acting socket-like to ensure low porting effort, high compatibility, and minimal programming effort. The shared memory 724 includes information in blocks to keep track of the number of FCA handles 710-720, buffers, etc. that are being used. Using this information, the FCA 722 can also provide monitoring functionality for monitoring processes and nodes associated with various clients.

The handles 710-720, although different from and more advantageous than the sockets, are built socket-like by having semantics as those of the sockets to provide an easy communication of data between the processes 702-706. The handles 710-720 are associated with one or more processes 702-706 to provide connection to facilitate a link between two processes 702-706. Furthermore, the association of the handles 710-720 with the processes 702-706 is used to an n-tuple that specifies the two endpoints of communication that make up a connection. The handles 710-720 that perform better than the sockets, but appear as socket-like, are created to make interprocess communication easy, such as have it look like standard UNIX file I/O. These functions are based on the client/server model. Further, different handles 710-720 may be used for different purposes.

Figure 8:
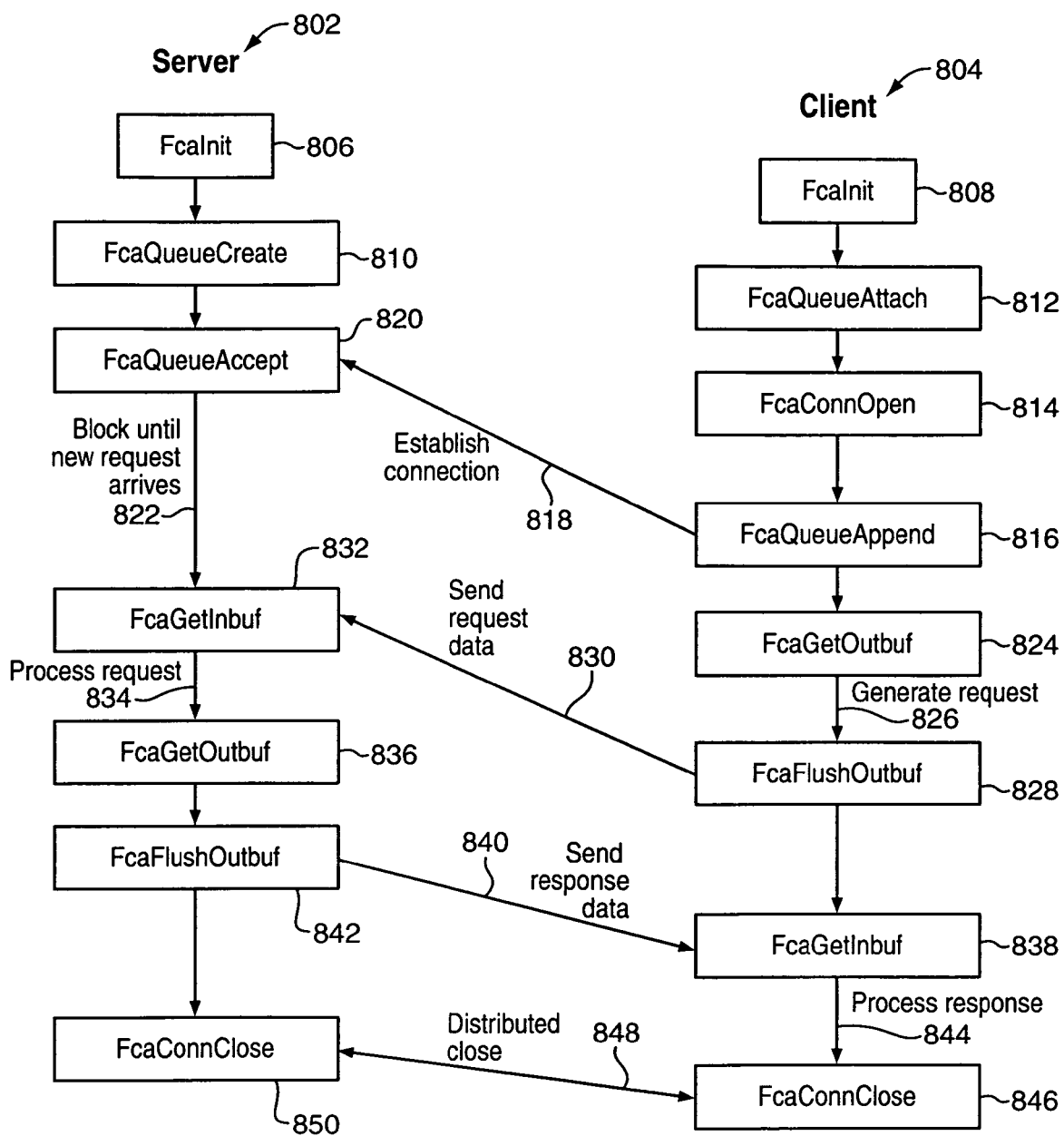
FIG. 8 is a diagram illustrating an embodiment of a transaction sequence between server and a client using a C Application Programming Interface for connection-oriented C Fast Channel Architecture communication.

FIG. 8 is a diagram illustrating an embodiment of a transaction sequence between server 802 and a client 804 using a C API for connection-oriented C Fast Channel Architecture (C FCA) communication. At the server 802, the FCA library is initialized 806. A new FCA request queue is then created 810 at the server 802. At the client 804, the FCA library is initialized 808 to facilitate FCA access. Then, attachment to the existing request queue (e.g., the newly created request queue) is sought 812. The client 804 opens a new connection 814 to the server 802 to insert new requests into the request queues and to receive responses from the server 802. The request is appended to the request queue 816.

At the sever 802, the new connection request from the client is accepted 820; however, the server 802 block any new connections 822 until a new request has arrived. The connection between the client 804 and the server 802 is established 818. The client 804 gets buffer for generating a request 824 and uses the buffer to generate the new request 826. The request is then flushed 828, which results in sending of the request data 830 to the server 802. The server 802 receives the data 832 and processes the request 834.

The server 802 then obtains buffer to generating a response to the request 836 and uses the buffer to generate the response. The response is then flushed 842, which results in sending of the response data 840 to the client 804. The client 804 receives the response data 838 and processes the response 844. The server 802 and this client 804 propose closing the connection 846, 850 when no longer necessitated, and the connection is closed 848.

Figure 9:
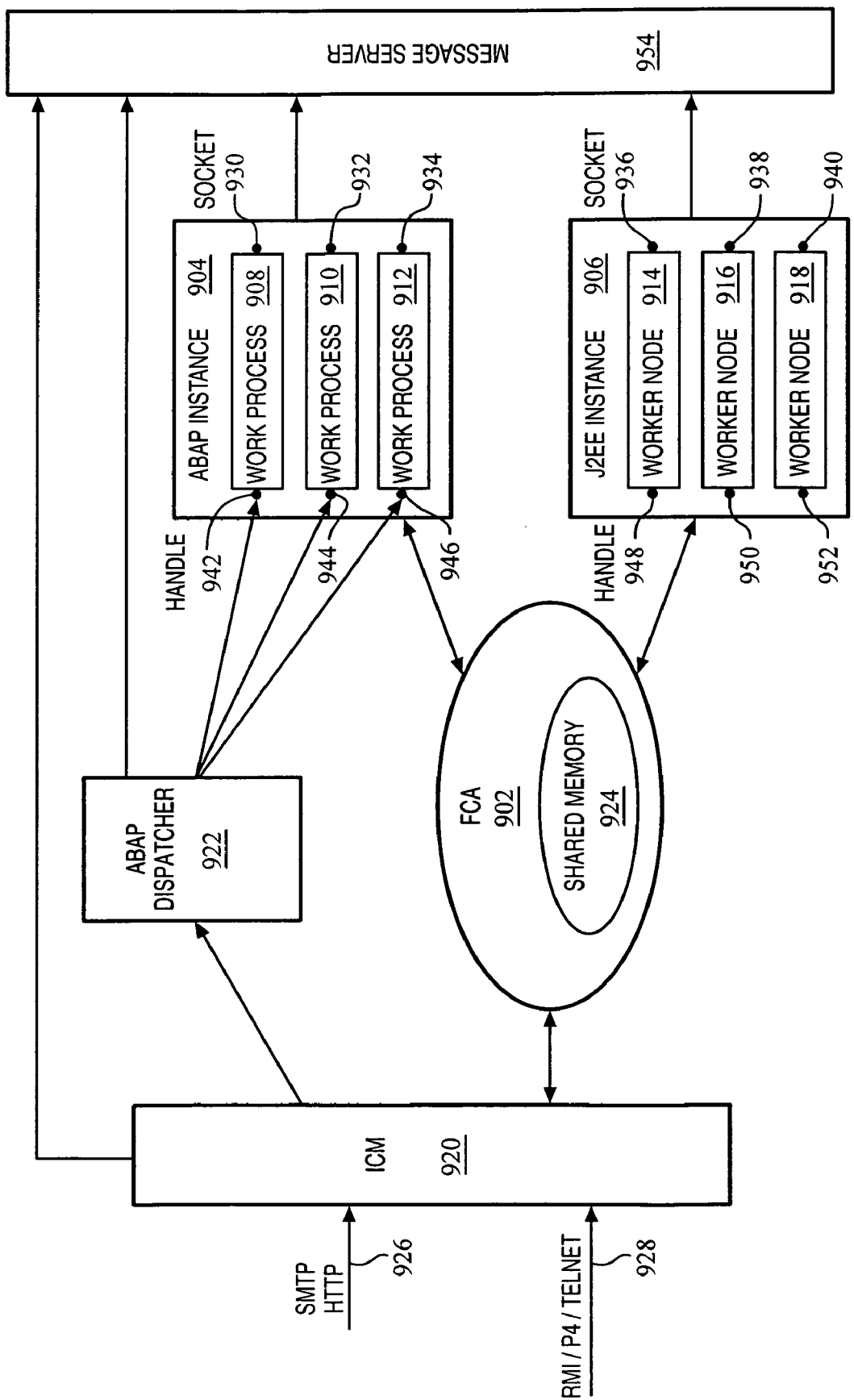
FIG. 9 is a block diagram illustrating an embodiment of a Web Application Server architecture having a Fast Channel Architecture including shared memory.

FIG. 9 is a block diagram illustrating an embodiment of a Web Application Server architecture (architecture) 900 having a Fast Channel Architecture (FCA) 902 including shared memory 924. In one embodiment, the FCA 922 includes shared memory 924 to facilitate bi-directional communication between various independent processes that include OS processes and further include specialized processes, such as the ABAP work processes 908-912 and the J2EE worker nodes 914-918. The shared memory 924 at the FCA 902 provides a fast, efficient, scalable, reliable, and secure communication between various work processes and worker nodes 908-918 on the same physical host. The shared memory-based bi-directional communication utilizes the centralized shared memory 924 for the work processes and worker nodes 908-918 and other components of the architecture 900 to share and access and thus, eliminating the need for having individualized local memory for communicating via a network. Furthermore, the use of the shared memory 924 provides for a copy-free communication, high bandwidth, and low latency.

Typical OS processes refer to tasks embedded in the operating system. For example, each time a client initiates a program or a document (e.g., opening Microsoft Word®), a request is placed with the operating system regarding commencing the task of opening the document for the client. Several of such processes can be performed simultaneously in the CPU by taking turns. Typically, an operating system provides the isolation of such processes, so they are less likely to interfere with each other, such as when there is a crashed process, none of the other processes are affected by it and so the potential system failure is avoided. For example, the operating system can increase isolation and robustness by allocating one process for each user session, and running a VM for that user session within the allocated process. However, in some situations (e.g., when there are a large number of user sessions), such operating system scheduling and allocation can add to the system overhead and consume valuable resources, such as time and space.

The processes may contain some memory (e.g., a region of virtual memory for suspended processes which contains executable code or task-specific data), operating system resources that are allocated to such processes (such as file descriptors, when referring to UNIX, and handles, when referring to Windows), security attributes, such as process owner and the process' set of permissions, and the processor state, such as the content of registers, physical memory addresses, etc.

Various enterprise servers and other large servers are considered request processing engines for processing large numbers of small user requests associated with user sessions. The user requests lead to the creation of processes, which refer to processing of such user requests. The processing of the requests usually involves the running of a user code (e.g., JAVA servlets or EJBs) in a runtime system (e.g., a JAVA virtual machine (JVM)) executing on a server. In such a server, scalability can be achieved by using multiple threads, such as a multi-threaded VM, to process requests corresponding to a number of user sessions.

In one embodiment, the shared memory 924 can provide a common access and a buffer for the process-attachable VMs, the OS processes including ABAP work processes 908-912 and J2EE worker nodes 914-918, as well as the dispatcher processes. It is to be noted that the ABAP work processes 908-912 at the ABAP engine 904 are considered specialized processes that are used for processing the OS processes with specialized functionality. The work processes 908-912 have the attributes and behavior that are also common with the OS processes and they may be created, scheduled, and maintained by the operating system. For example, the ABAP work processes 908-912 are to execute ABAP transactions, while the J2EE worker nodes 914-918, also regarded as specialized processes having similar attributes as the OS processes, are to execute the JAVA code.

Having introduced the FCA 902 to the architecture 900 facilitates an executable program (e.g., a program running on an OS process executing the code) to use the FCA functionalities by binding the FCA library at the time of development and by calling the FCA-API in the programming language (e.g., C or JAVA). For C, the API include a C API which includes different datatypes and API functions, but uses similar semantics as socket API to provide socket-like API for ease in communication and yet, having the benefits of a C API. For example, at runtime, the executable program operates as a process in the operating system, such as when a program (e.g., MS Word or Excel) is started several times, which creates several OS processes associated with one program that are performed using the FCA functionalities. In one embodiment, the FCA 902 may remain independent of a particular programming language (e.g., ABAP or JAVA) or a particular operating system (e.g., UNIX or Windows). The FCA functionalities (e.g., ABAP statements, transactions, input/output processing, etc.) may be achieved by coding such functionalities in the program. Stated differently, the program, when running, is executed as an OS process and as such it performs various tasks, such as reading/writing data, processing data, and accessing the FCA functionalities.

Although not illustrated here, a dispatcher (e.g., ABAP dispatcher 922) could serve as a central process on the application layer for processing transactions. For example, the ABAP dispatcher 922 facilitates the starting of the ABAP work processes 908-912, monitoring of the status of the work processes 908-912, restarting a work process 908-912 in case of a crash, communicating with the GUI, dispatching requests to the ABAP work processes 908-912 based on the availability of such work processes 908-912, and communicating with the message server 954. In one embodiment, the dispatcher may use the FCA-based shared memory 924 to communicate with the work processes 908-912, but the FCA 902 alone may not necessarily replace the dispatcher 922. However, the functionalities of the dispatcher 922 may be moved to other components and processes, such as to the Internet Communication Manger (ICM) 920 to perform one or more of the dispatcher-related tasks. In one embodiment, this can be performed by providing a code in the program, which when running on an OS process, can execute the code. Also, on the ABAP instance 904, the dispatcher may still remain to provide communication with GUI, such as the SAP GUI.

On the J2EE instance 906, in one embodiment, the functionality of the J2EE dispatcher (not shown) may be moved to the ICM 920. The moving of the J2EE dispatcher functionalities to the ICM 920 provides increased robustness, scalability, and a simple architecture with a single access point. In another embodiment, it is not required that the J2EE dispatcher be removed when using the FCA-based architecture 900 and that the FCA 902 can also work with the J2EE dispatcher to perform various tasks. In an alternative embodiment, with regard to dispatching various requests, neither the ABAP dispatcher 922 nor the J2EE dispatcher may be needed, because the user requests can be serially assigned to the available ABAP work processes 908-912 and J2EE worker nodes 914-918. For example, each ABAP work process 908-912 could maintain a request queue for various requests at the shared memory 924 and attach the VM of the user session corresponding to the request at the front of the request queue to process the next request.

In one embodiment, having the shared memory 924 helps eliminate the necessity for local memory or individually dispersed memory for performing requests and for communicating data. Stated differently, the shared memory 924, as opposed to a local memory using a network connection, is used to create a buffer (e.g., for receiving and transmitting data) for the work processes 908-912 and the worker nodes 914-918. For example, once a request to perform a particular task is received at the server from a client/user session, a process to be performed is initiated as the request is created. A request queue is created at the shared memory 924 and the recently-created request is then placed in the request queue. In one embodiment, the dispatcher 922 then determines the availability of various work processes 908-912 and, based on such availability, assigns the request to the available work process 908-912 to handle. The work process 908-912 performs the corresponding OS process to satisfy the client request. The satisfying of the request may include performing the requested task and providing the requested information or response data back to the client via the shared memory 924. In another embodiment, if the dispatcher 922 is not used, the ICM 920 may possess the functionalities of the dispatcher 922 and assign the request to, for example, the available ABAP work process 908-912 or J2EE worker node 914-918. The ABAP-related requests are sent to the ABAP work processes 908-912 and the JAVA-related requests are sent to the J2EE worker nodes 914-918. Having the shared memory 924 provided by the FCA 902 not only allows a copy-free transmission of the data, but also eliminates the potential of the data being lost due to connection or network failures. Furthermore, using a single shared memory 924 allows the various tasks to run on a single local host, which in turn, provides a secure transmission of data. In one embodiment, the shared memory 924 includes memory pipes that are used bi-directionally and are created at startup along with initialization of the FCA 902.

In one embodiment, a block of the shared memory 924 may be set aside to generate request queues with each request queue having one or more requests to be performed. In one embodiment, the work processes 908-912 and worker nodes 914-918 may have direct access to this block of the shared memory 924 or a portion of the block may be mapped to the address space of the selected work processes 908-912 and worker nodes 914-918. The mapped portion, for example, may include the computational state of the VM, while the VM is associated with the selected work process/worker node 908-918. The associated VM can then be executed by the selected work process/worker node 908-918 to process the corresponding request. Once the request is processed, the VM may be detached from the selected work process/worker node 908-918 and the work process/worker node 908-918 returns to the pool of work processes/worker nodes 908-918. Also, the block of the shared memory 924 can then be unmapped and made available for other tasks.

In one embodiment, the architecture 900 employs FCA handles 942-952 as communication end-points. The handles 942-952 are regarded as an entity at the FCA 902 level for providing communication. Although the handles 942-952 are not sockets, they act socket-like. For example, the handles 942-952 are presented as sockets to the programmers and developers for their convenience and familiarity, but the architecture 900 has the benefits of employing the handles. The handles 942-952 are employed using the FCA communication layer at the FCA 902. However, the handles 942-952 are presented as sockets or socket-like by using another layer at the FCA 902, called the C FCA layer. The FCA layer may also include C++ FCA layer, C# FCA layer, VISUAL BASIC, FCA layer, JAVA layer, and the like. The C FCA layer presents the handles 942-952 as C-based sockets for socket connection-oriented C FCA communication. Such communication is compatible with C-based socket-oriented communication and thus, it is particularly easy for programmers and developers to use when programming with the C language.

In the illustrated embodiment, the FCA-based handles 942-946 are shown as associated with each of the ABAP-based work processes 908-912. The handles 942-946 work as communication end-points to facilitate communication between the work processes 908-912 and the shared memory 924 and the ABAP dispatcher 922. Similarly, the handles 948-952 are shown as associated with each of the J2EE-based worker nodes 914-918. The handles 948-952 are also used as end-points to facilitate communication between the worker nodes 914-918 and the shared memory 924 and a J2EE dispatcher, when used. Further, for example, sockets 930-940 may be used to serve as end-points for communication between the work processes 908-912 and worker nodes 914-918 and the message server 954.

Furthermore, the shared memory 924 at the FCA 902 allows for creating and connecting of the queues rather than solely relying on retrying the same queues. Having the shared memory 924 reduces administrative costs, while increasing consistency and easing communication between various processes 902-906. When the shared memory 924 is regarded as a pool of shared memories, it may include various entities, such as data, datagrams, application update information, strings, constants, variable, objects that are instances for a class, runtime representations of a class, and classloaders that are used to load class runtime representatives.

In the illustrated embodiment, the FCA 902 provides an FCA-based shared memory 924 in communication with an ICM 920, an ABAP instance 904, and a J2EE instance 906. The ABAP instance 904 includes various specialized work processes 908-912 that are, based on their availability, assigned various ABAP-based OS processes/client requests to perform. The architecture 900 further includes the J2EE instance 906, which includes server nodes or worker nodes 914-918 to complement the ABAP work processes 908-912 to perform various JAVA-based tasks (e.g., performing client requests/OS processes) that are assigned to them. In one embodiment, the J2EE instance 906 may include JAVA Virtual Machines (JVMs), while the ABAP instance 904 may include ABAP language VMs (ABAP VMs). The ABAP is a programming language for developing applications for the SAP R/3 system, which is a widely installed business application system developed by SAP AG. The CLR is a managed code execution environment developed by Microsoft Corp. of Redmond, Wash.

The shared memory 924 includes memory pipes, which are used bi-directionally, to provide bi-directional communication between various components of the architecture 900 that include the ABAP instance 904 and the J2EE instance 906 and their work processes 908-912 and worker nodes 914-918, respectively, the ICM 920, and other third-party applications. In one embodiment, having the shared memory 924 eliminates the necessity for the J2EE instance 906 to communicate with the ICM 920, and ultimately the client, via the TCP/IP connection. Instead, the J2EE instance 906 and the ABAP instance 904 are integrated such that both instances 904-906 are in communication with the ICM 920 via the shared memory 924. Further, the J2EE instance 906 is no longer required to have a dispatcher to dispatch client requests to various J2EE-based worker nodes 914-918. In one embodiment, the dispatcher-related tasks may be performed at the ICM 920 and, in another embodiment, the J2EE dispatcher may still be maintained and used in communication with the J2EE instance 906.

In one embodiment, the FCA 902 is used to provide an integration point for the ABAP and J2EE instances 904-906, which allows the J2EE worker nodes 914-918 and the ABAP work processes 908-912 to have access to the same centralized shared memory 924. Stated differently, not only the ABAP instance 904 and its work processes 908-912 having access to the FCA-based shared memory 924, but also the J2EE instance 906 and its worker nodes 914-918 have access to the same shared memory 924, which allows for direct bi-directional communication between various components of the architecture 900, including the work processes 908-912 and the worker nodes 914-918. Having access to the common shared memory 924 eliminates the need for associating individualized local memory for each of the work processes 908-912 and worker nodes 914-918 and the need for distributing the memory to various components of the architecture 900. Furthermore, the FCA-based shared memory 924 provides a common or centralized memory for each of the components to access, which eliminates the need for individualized/localized cache use for communicating entities (e.g., placing requests, updating data, retrieving responses) between components.

In one embodiment, the FCA 902 is used to provide a common API to facilitate the common access to the shared memory 924 and to provide direct bi-directional communication between various components of the architecture 900. In one embodiment, the shared memory 924 includes memory pipes that are used in a bi-directional fashion to facilitate the bi-directional communication between, for example, the ICM 920 and the ABAP and J2EE instances 904-906. The use of the shared memory 924 results in a cost-effective, efficient, fast, robust, and copy-free communication of entities between various components of the architecture 900. Using the shared memory 924 also allows for the integration of the J2EE instance 906 and the ICM 920 by providing direct and bi-directional communication between the two. For instance, the communication data is transported via the shared memory 924 and only local load-balancing is necessitated and further, protocols, such as RMI, P4, and Telnet, are ported through the ICM 920. Other protocols, such as SMTP, HTTP, HTTPS, Network News Transport Protocol (NNTP), Fast Common Gateway Interface (FastCGI), remain ported through the ICM 920.

In one embodiment, the ICM 920 is used to facilitate communication between the architecture 900 and the clients by providing a browser or browser-like access to the user. The Internet protocols supported by the ICM 920 are provided as plug-ins for other standard protocols (e.g., HFTP, SMTP). For example, in a server role, the ICM 920 processes requests from the Internet that are received from the client via a Uniform Resource Locator (URL) with the server/port combination that the ICM 920 listens. The ICM 920 then invokes the local handler responsible for processing these requests, based on the URL. Applications (e.g., Business Server Page (BSP)) needing an ABAP context are transferred to the ABAP work processes 908-912, while JAVA requests are transferred to the J2EE instance 906 to be processed by the J2EE worker nodes 914-918. In one embodiment, the transfer of the requests between the ICM 920 and the ABAP instance 904 is conducted via the ABAP dispatcher 922, which also serves as a load balancer and a point for providing connection to a GUI. On the J2EE side 906, the dispatcher may not be present or necessitated.

The ICM 920 may include a central request queue for requests that are processed on worker threads. Various time-consuming operations (e.g., accept, SSL handshake, read, write, handshake, and close) are triggered through a request in the ICM request queue, which may not be protocol-specific. The queues in the shared memory 924 include request queues for each of the work processes 908-912 and the worker nodes 914-918. The request queues include OS processes for dispatching and processing by the work processes 908-912 and/or the worker nodes 914-918. The number of entries in the request queues at the shared memory 924 provides an indication of the load situation of the server. The queues in shared memory 924 may also include other relevant information, such as information to help with FCA Queue Monitoring (FQM). The values may include the name of the queue (set at startup), current number of requests in the queue (set by a dedicated process), peak number of requests (maintained by FCA), maximum number of requests (fixed value that can be set at startup), last insert (maintained by FCA), and last remove (maintained by FCA).

Figure 10A:
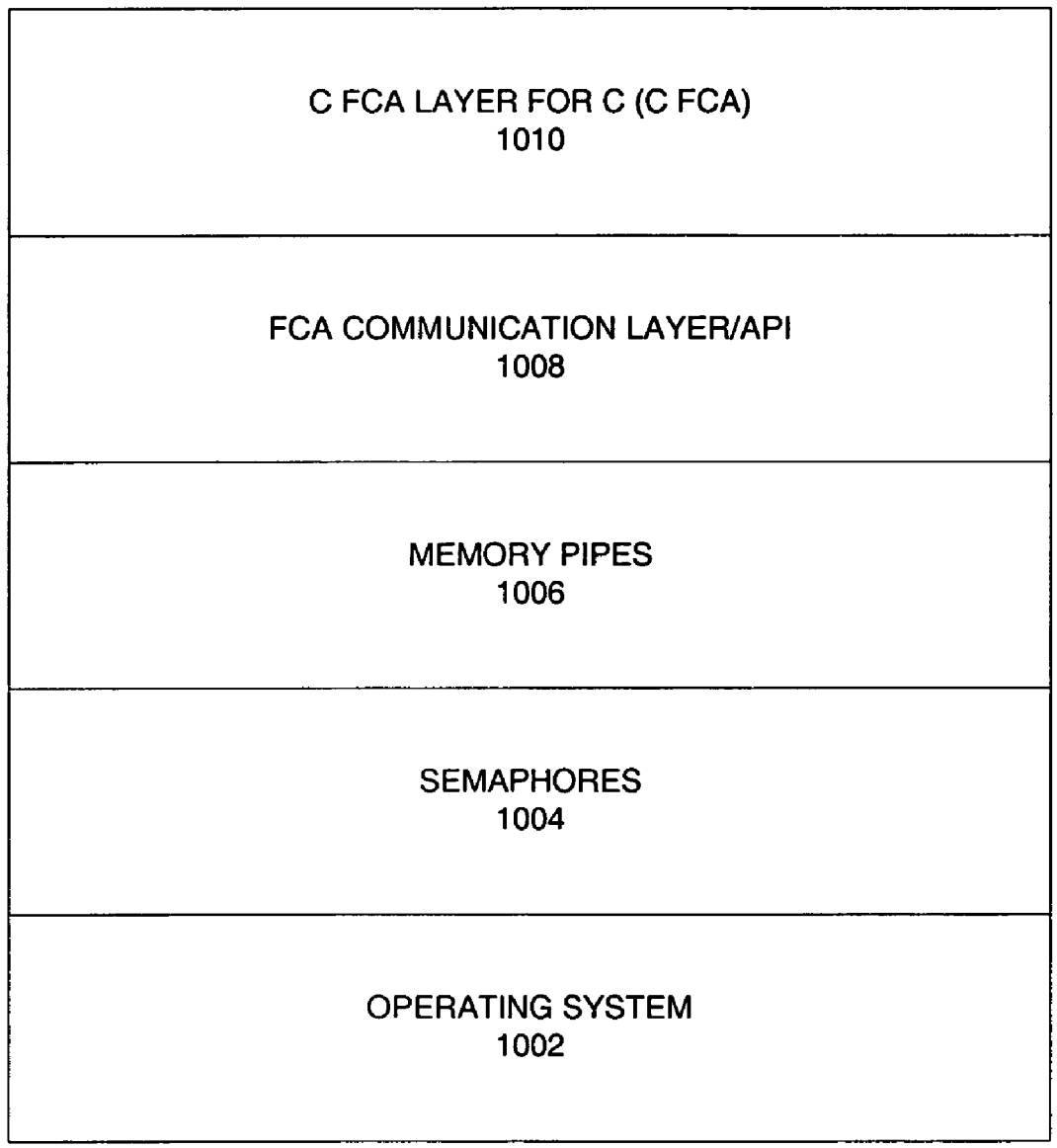

FIGS. 10A and 10B are block diagrams illustrating embodiments of the layering of the Fast Channel Architecture 1000. Referring to FIG. 10A, the architecture 1000 is provided to make data processing more efficient and effective by facilitate the enhancement and optimization of communication between various components of the Web AS, particularly the ABAP and J2EE engines (as detailed with reference FIG. 9). By providing direct and bi-directional communication between the ABAP and J2EE engines and their work processes and worker nodes, respectively, a level of tight, optimized, and fast coupling of the components is achieved using a single application server. Furthermore, the direct and bi-directional communication between the ICM and the J2EE engine is also achieved, which in turn, provides a better communication with external partners (e.g., clients) when receiving incoming requests and transmitting outgoing responses.

In one embodiment, these improvements are achieved by providing a common access to a commonly shared memory using memory pipes 1006 and other necessary layers 1002-1004 and 1008 of the architecture 1000. Such use of the shared memory using the memory pipes 1006 also provides secure and copy-free transfer of data, and decreased network overhead, latency, copy operations, and process switches. Further, to integrate the J2EE engine and the ICM, as illustrated in FIG. 9, various protocols, such as RMI, P4, and Telnet, are ported through the ICM, while the shared memory is used as a common access point to transport and communicate data.

In the illustrated embodiment, the architecture 1000 includes a layer of operating system 1002. The operating system 1002 refers to the master control program that runs the computer. The first program is loaded when the computer is turned on, its main part, the kernel, resides in memory at all times. The operating system 1002 sets the standards for all application programs that run on the computer. Further, the applications communicate with the operating system 1002 for user interface and file management operations. Some examples of the operating system 1002 include Windows (e.g., 95, 98, 2000, NT, ME, and XP), Unix (e.g., Solaris and Linux), Macintosh OS, IBM mainframe OS/390, and AS/400's OS/400. Disk Operating System (DOS) is still used for some applications, and there are other special-purpose operating systems as well.

In one embodiment, the semaphores 1004 occupy another layer of the architecture 1000. The semaphores 1004 refer to the shared space for interprocess communications (IPC) controlled by "wake up" and "sleep" commands. For example, the source process fills a queue and goes to sleep until the destination process uses the data and tells the source process to wake up. The semaphores 1004 are provided to work together with the memory pipes 1006, which occupy another layer of the architecture 1000, to facilitate the shared memory. The memory pipes 1006 refer to a fast memory based communication providing pipes that are to transport communication data between various components of the architecture 1000.

Using the architecture 1000, these memory pipes 1006 are utilized bi-directionally at the shared memory to relatively efficiently and quickly transport data between various components. The communication between processes and components is facilitated and further enhanced by the FCA communication layer 1008, which include a communication interface or API. The communication layer 1008 works with the semaphores 1004 and the memory pipes 1006 to facilitate direct and bi-directional communication between processes and components and to keep the communication efficient, secure, and fast. Further, the communication layer 1008 works as an API to external inputs, third-party applications, and clients.

In one embodiment, in addition to the layers 1002-1008 described, the FCA 1000 may also includes a C FCA layer/ API 1010 for C to provide socket-like interface for the C language. For example, the C FCA layer 1010 is used to provide C-based communication for external applications and to present the FCA handles as socket-like for C. This is also for programmers who use C to make use of the architecture 1000. As noted above in this document, C is merely being used as an example and clarity and the embodiment of the invention are not limited to C. Stated differently, the FCA layer 1010 may includes an FCA layer/API that is used with various other programming languages, such as C++, C#, VISUAL BASIC, JAVA, and the like. Regarding handles, the architecture 1000 employs FCA handles as communication end-points, but they are communicated to the programmers as socket-like, which are well-known but are not as efficient as handles, using C FCA interface layer 1010. Similarly, referring now to FIG. 10B, the FCA 1000 provides other types of interface layers for other programming languages, such as a JAVA FCA interface layer for JFCA 1012, to provide another interface to external applications and to facilitate an easier way to use the shared memory when programming with such languages. The JFCA 1012 is merely used as an example. The JFCA 1012 may be substituted for any number of other layers, such as C FCA, C++FCA, C# FCA, VISUAL BASIC FCA, and the like. The C FCA layer 1010 and the JFCA layer 1012 may be used in combination with each other and with other layers for providing interface for any additional programming languages.

Figure 11:
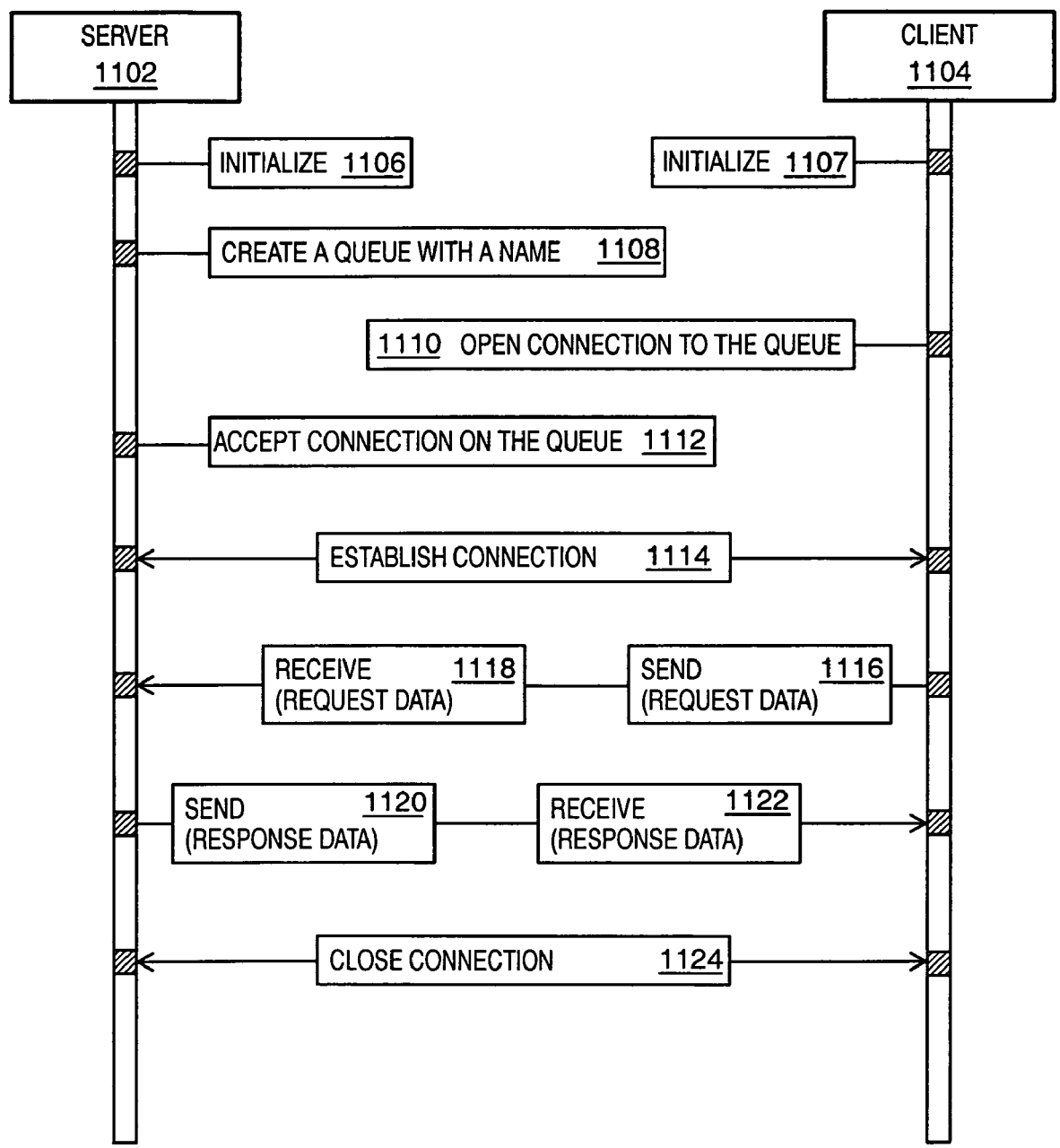
FIG. 11 is a diagram illustrating an embodiment of a transactional sequence between a client and a server using a Fast Channel Architecture-based shared memory.

FIG. 11 is a diagram illustrating an embodiment of a transactional sequence between a client 1104 and a server 1102 using a Fast Channel Architecture-based shared memory. First, the FCA library is initialized 1106 at the server 1102. The initialization 1106 is performed once at startup. Then, the server-side request queue is created 1108. The request queue may be created 1108 with a name specified by a parameter name. On the client-side, first, initialization is performed 1107 and then, a new connection object is created 1110 for the specified protocol, which is identified by the FCA protocol. The server 1102 waits for the incoming connection from the client 1104 and once the connection is opened 1110 at the client, the server 1102 accepts the open connection at the queue 1112. In one embodiment, the FCA queue connection is accepted 1112 by the server 1102 by returning an FCA connection handle to the client 1104. With that, the request queue is successfully opened and the connection between the client 1104 and the server 1102 is established 1114 using the FCA-based shared memory.

In one embodiment, once the connection is established 1114, the client 1104 sends 1116 a request to the server 1102. The request is created as a result of an operating system process being initiated, which is initiated in response to a user opening a program or a document. The server 1102 receives the request having request data 1118 from the client 1104. The request is then processed at the server 1102 using various entities, such as work processors and/or worker nodes, and the server 1102 then sends the response data 1120 in response to the request from the client 1104 to the client 1104. The client 1104 receives the response data 1122. The FCA connection is then closed 1124 when it is not longer needed by both sides (distributed close).

Figure 12:
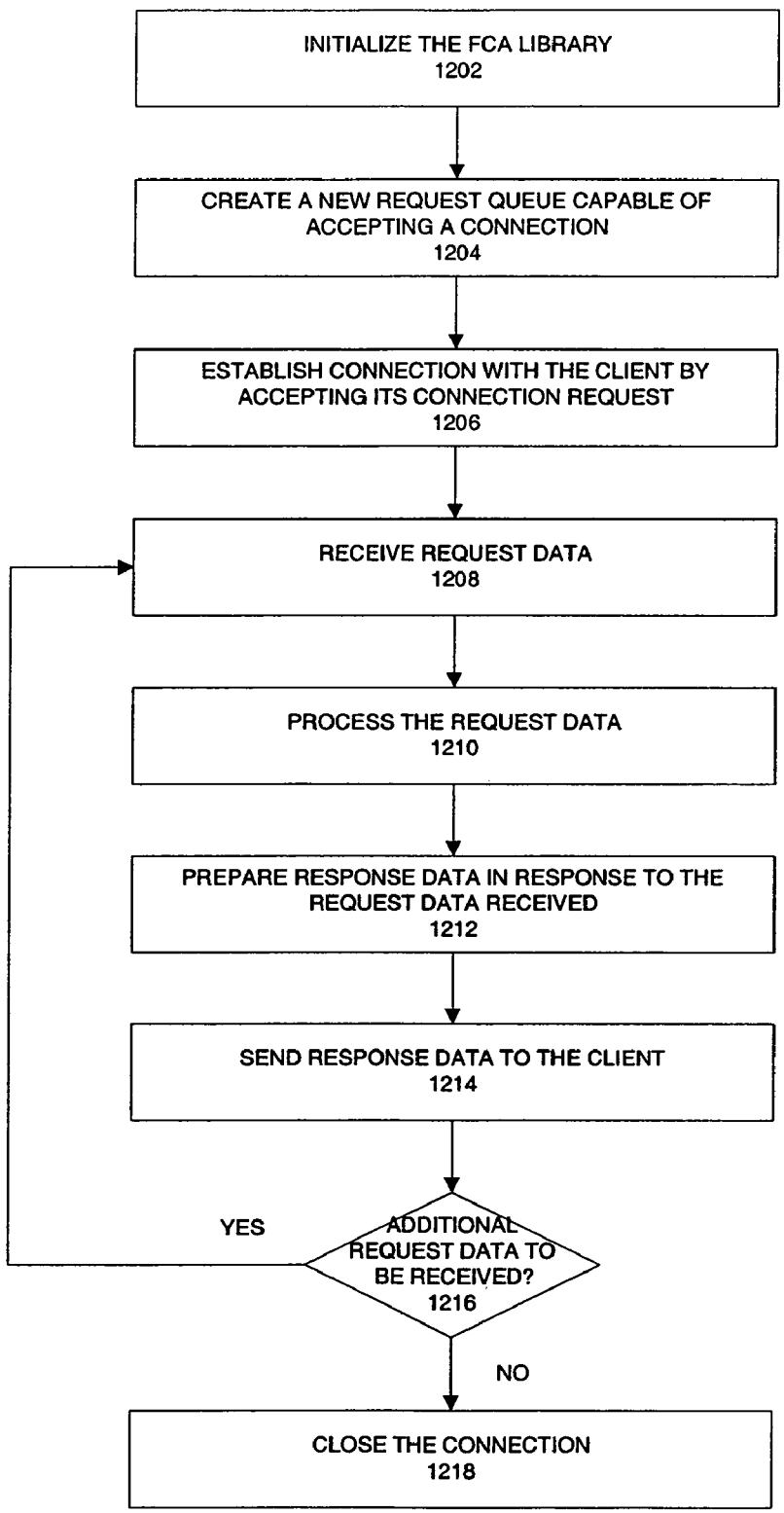
FIG. 12 is a flow diagram illustrating an embodiment of a process for using a C Application Programming Interface for connection-oriented C Fast Channel Architecture communication.

FIG. 12 is a flow diagram illustrating an embodiment of a process for using a C API for connection-oriented C Fast Channel Architecture communication. At first, the FCA library is initialized at processing block 1202. The FCA library is initialized both at the server and at the client seeking connection with the server. A new request queue with connection capabilities is created at the server at processing block 1204. In one embodiment, the connection is then established between the server and client with the server accepting the client's connection request at processing block 1206. The client may then generate a request having request data for the server to process.

At processing block 1208, the server receives the request data from the client. The request data is then processed at the server at processing block 1210. In processing of the request data, a reply having response data is prepared at the server at processing block 1212. The response data is then sent to the client at processing block 1214. At decision block 1216, a determination is made as to whether additional requests are to be received from this client. If yes, the process continues with the server receiving additional request data at processing block 1208. If not, the connection is not longer necessitated and is closed at processing block 1218.

Figure 13:
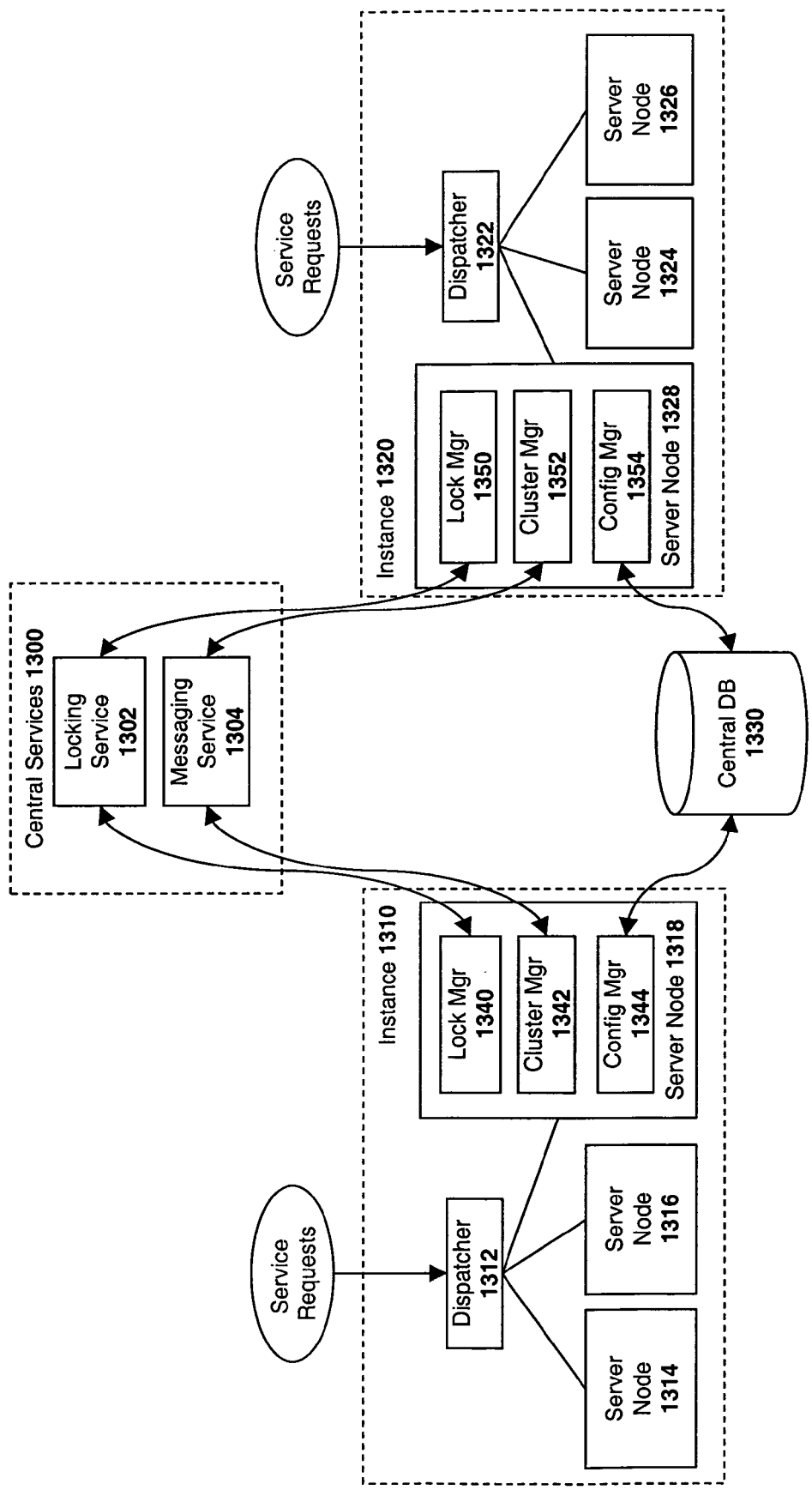
FIG. 13 is a block diagram illustrating an embodiment of a server node system architecture.

A system architecture according to one embodiment of the invention is illustrated in FIG. 13. The architecture includes a central services instance 1300 and a plurality of application server instances 1310, 1320. As used herein, the application server instances, 1310 and 1320, each include a group of server nodes 1314, 1316, 1318 and 1324, 1326, 1328, respectively, and a dispatcher, 1312, 1322, respectively. The central services instance 1300 includes a locking service 1302 and a messaging service 1304 (described below). The combination of all of the application server instances 1310, 1320 and the central services instance 1300 is referred to herein as a "cluster." Although the following description will focus solely on instance 1310 for the purpose of explanation, the same principles apply to other instances such as instance 1320.

The sever nodes 1314, 1316, 1318 within instance 1310 provide the business and/or presentation logic for the network applications supported by the system. Each of the sever nodes 1314, 1316, 1318 within a particular instance 1310 may be configured with a redundant set of application logic and associated data. In one embodiment, the dispatcher 1310 distributes service requests from clients to one or more of the sever nodes 1314, 1316, 1318 based on the load on each of the servers. For example, in one embodiment, the dispatcher 1310 implements a round-robin policy of distributing service requests.

The sever nodes 1314, 1316, 1318 may be J2EE sever nodes which support Enterprise JAVA Bean ("EJB") components and EJB containers (at the business layer) and Servlets and JAVA Server Pages ("JSP") (at the presentation layer). Of course, the embodiments of the invention described herein may be implemented in the context of various different software platforms including, by way of example, Microsoft .NET platforms and/or the ABAP platforms developed by SAP AG, the assignee of the present application.

In one embodiment, communication and synchronization between each of the instances 1310, 1320 is enabled via the central services instance 1300. As illustrated in FIG. 13, the central services instance 1300 includes a messaging service 1304 and a locking service 1302. The message service 1304 allows each of the servers within each of the instances to communicate with one another via a message passing protocol. For example, messages from one server may be broadcast to all other servers within the cluster via the messaging service 1304 (e.g., such as the cache configuration messages described below). Alternatively, messages may be addressed directly to specific servers within the cluster (i.e., rather than being broadcast to all servers).

In one embodiment, the locking service 1302 disables access to (i.e., locks) certain specified portions of configuration data and/or program code stored within a central database 1330 or resources shared in the cluster by different services. The locking manager locks data on behalf of various system components which need to synchronize access to specific types of data and program code (e.g., such as the configuration managers 1344, 1354). As described in detail below, the locking service enables a distributed caching architecture for caching copies of server/dispatcher configuration data.

In one embodiment, the messaging service 1304 and the locking service 1302 are each implemented on dedicated servers. However, the messaging service 1304 and the locking service 1302 may be implemented on a single server or across multiple servers while still complying with the underlying principles of the invention.

As illustrated in FIG. 13, each sever node (e.g., 1318, 1328) includes a lock manager 1340, 1350 for communicating with the locking service 1302; a cluster manager 1342, 1352 for communicating with the messaging service 1304; and a configuration manager 1344, 1354 for communicating with a central database 1330 (e.g., to store/retrieve configuration data as described herein). Although the lock manager 1340, 1350, cluster manager 1342, 1352 and configuration manager 1344, 1354 are illustrated only with respect to sever nodes 1318 and 1328 in FIG. 13, each of the sever nodes 1314, 1316, 1324 and 1326 and/or on the dispatchers 1312, 1322 may be equipped with equivalent lock managers, cluster managers and configuration managers while still complying with the underlying principles of the invention.

Figure 14:
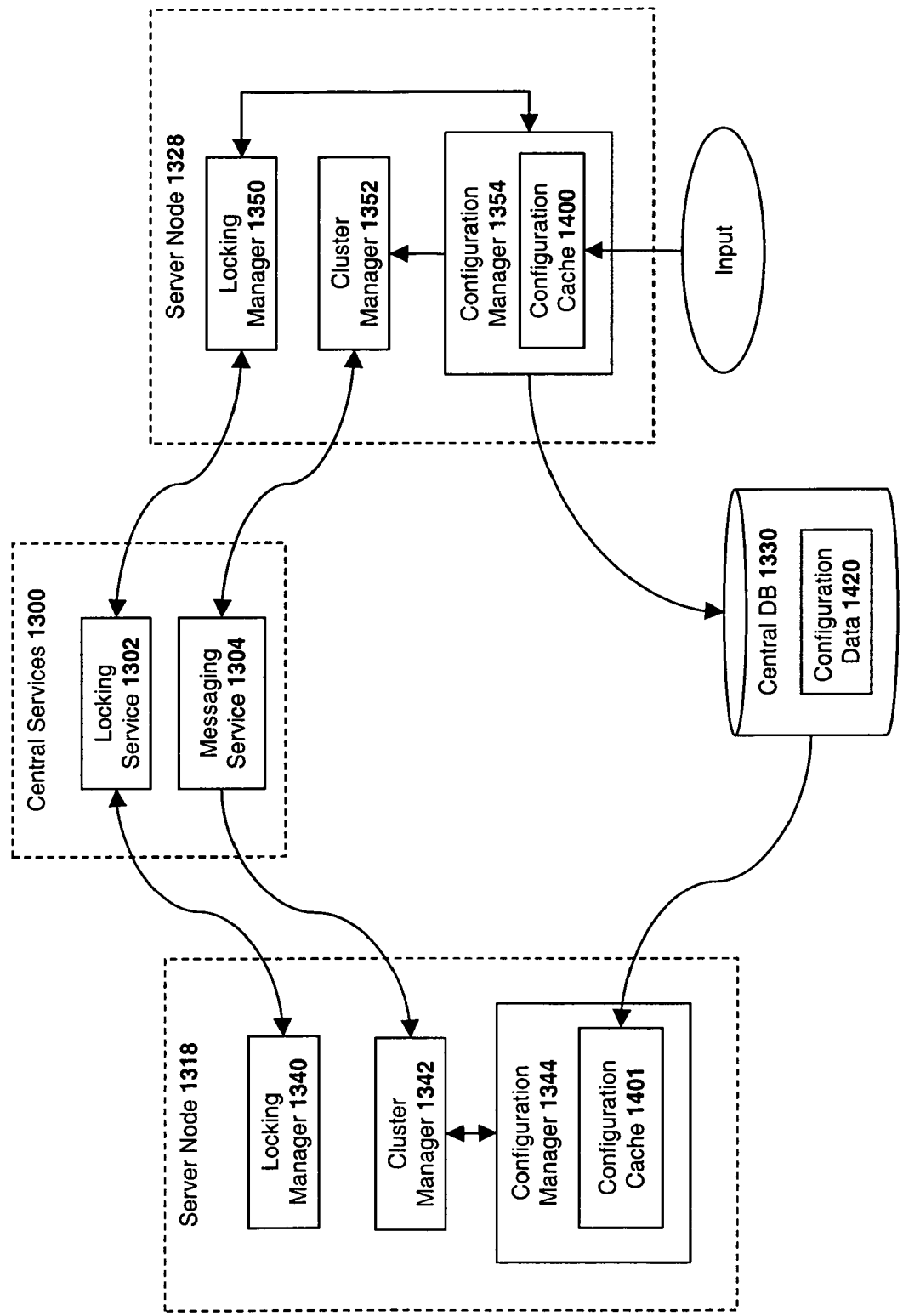
FIG. 14 is a block diagram illustrating an embodiment of a server node architecture which employs a configuration data caching.

Referring now to FIG. 14, in one embodiment, configuration data 1420 defining the configuration of the central services instance 1300 and/or the sever nodes and dispatchers within instances 1310 and 1320, is stored within the central database 1330. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1344, 1354 cache configuration data locally within configuration caches 1400, 1401. As such, to ensure that the configuration data within the configuration caches 1400, 1401 remains up-to-date, the configuration managers 1344, 1354 implement cache synchronization policies, as described herein.

Figure 15:
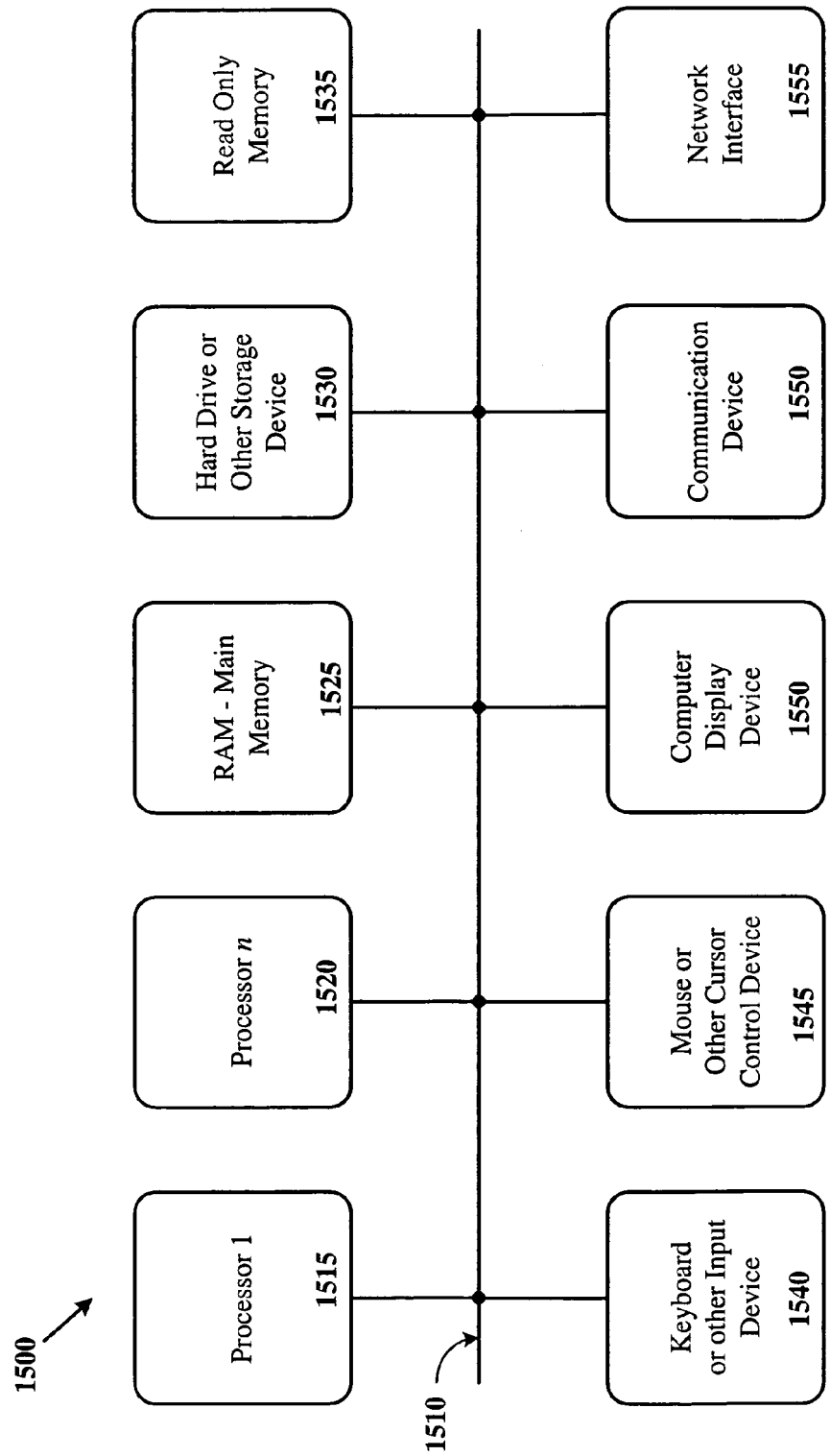
FIG. 15 is an exemplary computer system used in implementing an embodiment of the present invention.

FIG. 15 is an exemplary computer system 1500 used in implementing an embodiment of the present invention. In this illustration, a system 1500 comprises a bus 1510 or other means for communicating data. The system 1500 includes one or more processors, illustrated as shown as processor 1 1515 through processor n 1520 to process information. The system 1500 further comprises a random access memory (RAM) or other dynamic storage as a main memory 1525 to store information and instructions to be executed by the processor 1515 through 1520. The RAM or other main memory 1525 also may be used for storing temporary variables or other intermediate information during execution of instructions by the processors 1515 through 1520.

A hard drive or other storage device 1530 may be used by the system 1500 for storing information and instructions. The storage device 1530 may include a magnetic disk or optical disc and its corresponding drive, flash memory or other non-volatile memory, or other memory device. Such elements may be combined together or may be separate components. The system 1500 may include a read only memory (ROM) 1535 or other static storage device for storing static information and instructions for the processors 1515 through 1520.

A keyboard or other input device 1540 may be coupled to the bus 1510 for communicating information or command selections to the processors 1515 through 1520. The input device 1540 may include a keyboard, a keypad, a touch-screen and stylus, a voice-activated system, or other input device, or combinations of such devices. The computer may further include a mouse or other cursor control device 1545, which may be a mouse, a trackball, or cursor direction keys to communicate direction information and command selections to the processors and to control cursor movement on a display device. The system 1500 may include a computer display device 1550, such as a cathode ray tube (CRT), liquid crystal display (LCD), or other display technology, to display information to a user. In some environments, the display device may be a touch-screen that is also utilized as at least a part of an input device. In some environments, the computer display device 1550 may be or may include an auditory device, such as a speaker for providing auditory information.

A communication device 1550 may also be coupled to the bus 1510. The communication device 1550 may include a modem, a transceiver, a wireless modem, or other interface device. The system 1500 may be linked to a network or to other device using via an interface 1555, which may include links to the Internet, a local area network, or another environment. The system 1500 may comprise a server that connects to multiple devices. In one embodiment the system 1500 comprises a JAVA compatible server that is connected to user devices and to external resources.

While the machine-readable medium 1530 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1500 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 1500 may vary from implementation to implementation depending upon numerous factors, such as price constraints, performance requirements, technological improvements, and/or other circumstances.

It should be noted that, while the embodiments described herein may be performed under the control of a programmed processor, such as processors 1515 through 1520, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   integrating at an application server first processes and second processes via a communication system of the application server, the communication system having a shared memory, the first processes including specialized processes of an operating system of the application server, and the second processes including specialized processes of the operating system, the first processes and the second processes are independent of each other, the first processes executing first transactions via a first programming engine of the application server, and the second processes executing second transactions via a second programming engine of the application server, wherein the first transactions are independent of the second transactions,
   facilitating bi-directional and unduplicated communication between the first and second processes via sockets of the shared memory, the sockets of shared memory serving as a common communication interface for the first and second processes when communicating bi-directionally,
   wherein at least one socket of the sockets is associated with each of the first and second processes, and the sockets are further to serve as a user interface to expose the first and second processes to a user;
   creating a handle to serve as a communication end-point for communication of data via the shared memory;
   the application server providing to a client system an application programming interface (API) for accessing the handle, wherein the API is presented to the client system as the API for accessing a socket;
   wherein the communication interface and API for accessing the handle comprise one or more a C-based interface, a C++-based interface, a C#-based interface, a Visual Basic-based interface, and a Java-based interface;
   receiving at a network communication manager of the application server the client request via the provided API for accessing the handle; and
   sending the received client request from the network communication manager of the application server to one of the first programming engine and second programming engine via the shared memory,
   wherein each of the first and second programming engines is associated with a programming language, wherein the first programming engine includes an Advanced Business Application Programming (ABAP) engine, and the second programming engine includes a Java 2 Enterprise Edition (J2EE) engine, wherein the first transactions include ABAP-related transactions, and the second transactions include Java-related transactions.

2. A system comprising:
   a server having a processor and a storage medium coupled with the processor, the server further having an application server, the application server to integrate first processes and second processes via a communication system of the application server, the communication system having a shared memory, the first processes including specialized processes of an operating system of the application server, and the second processes including specialized processes of the operating system, the first processes and the second processes are independent of each other, the first processes executing first transactions via a first programming engine of the application server, and the second processes executing second transactions via a second programming engine of the application server, wherein the first transactions are independent of the second transactions; the application server further to facilitate bi-directional and unduplicated communication between the first and second processes via sockets of the shared memory, the sockets of shared memory serving as a common communication interface for the first and second processes when communicating bi-directionally,
   wherein at least one socket of the sockets is associated with each of the first and second processes, and the sockets are further to serve as a user interface to expose the first and second processes to a user the application server further to create a handle to serve as a communication end-point for communication of data via the shared memory, the application server further to provide to a client system an application programming interface (API) for accessing the handle, wherein the API is presented to the client system as an API for accessing a socket;
   wherein the communication interface and API for accessing the handle comprise one or more of a C-based interface, a C++-based interface, a C#-based interface, a Visual Basic-based interface, and a Java-based interface;
   a network communication manager of the application server to receive a client request via the provided API for accessing the handle, the network communication manager further to send the received client request to one of the first programming engine and second programming engine via the shared memory,
   wherein each of the first and second programming engines is associated with a programming language, wherein the first programming engine includes an Advanced Business Application Programming (ABAP) engine, and the second programming engine includes a Java 2 Enterprise Edition (J2EE) engine, wherein the first transactions include ABAP-related transactions and Java-related transactions.

3. A machine-readable storage medium comprising instructions which, when executed, cause a machine to perform a method comprising:
   integrating at an application server first processes and second processes via a communication system of the application server, the communication system having a shared memory, the first processes including specialized processes of an operating system of the application server, and the second processes including specialized processes of the operating system, the first processes and the second processes are independent of each other, the first processes executing first transactions via a first programming engine of the application server, and the second processes executing second transactions via a second programming engine of the application server, wherein the first transactions are independent of the second transactions;

facilitate bi-directional and unduplicated communication between the first and second processes via sockets of the shared memory, the sockets of shared memory serving as a common communication interface for the first and second processes when communicating bi-directionally, wherein at least one socket of the sockets is associated with each of the first and second processes, and the sockets are further to serve as a user interface to expose the first and second processes to a user;

creating a handle to serve as a communication end-point for communication of data via the shared memory;

the application server providing to a client system an application programming interface (API) for accessing the handle, wherein the API is presented to the client system as the API for accessing a socket;

wherein the communication interface and API for accessing the handle comprise one or more of a C-based interface, a C++-based interface, a C#-based interface, a Visual Basic-based interface, and a Java-based interface;

receiving at a network communication manager of the application server the client request via the provided API for accessing the handle; and sending the received client request from the network communication manager of the application server to one of the first programming engine and second programming engine via the shared memory, wherein each of the first and second programming engines is associated with a programming language, wherein the first programming engine includes an Advanced Business Application Programming (ABAP) engine, and the second programming engine includes a Java 2 Enterprise Edition (J2EE) engine, wherein the first transactions include ABAP-related transactions, and the second transactions include Java-related transactions.

* * * * *